(12) United States Patent
Otsuki

(10) Patent No.: US 12,247,992 B2
(45) Date of Patent: Mar. 11, 2025

(54) ANALYZER AND ANALYZER CONTROL METHOD

(71) Applicant: SYSMEX CORPORATION, Kobe (JP)

(72) Inventor: Kikuko Otsuki, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 83 days.

(21) Appl. No.: 16/585,275

(22) Filed: Sep. 27, 2019

(65) Prior Publication Data

US 2020/0103431 A1 Apr. 2, 2020

(30) Foreign Application Priority Data

Sep. 28, 2018 (JP) .................................. 2018-185493

(51) Int. Cl.
*G01N 35/04* (2006.01)
*G01N 35/00* (2006.01)
*G01N 35/02* (2006.01)

(52) U.S. Cl.
CPC ....... *G01N 35/04* (2013.01); *G01N 35/00584* (2013.01); *G01N 35/025* (2013.01);
(Continued)

(58) Field of Classification Search
CPC ............. G01N 35/04; G01N 35/00584; G01N 35/025; G01N 2035/0444;
(Continued)

(56) References Cited

U.S. PATENT DOCUMENTS 4,349,128 A * 9/1982 Sanfilippo ................. A47F 1/03
222/129
4,722,267 A * 2/1988 Galockin ............ G07F 17/0085
126/374.1

(Continued)

FOREIGN PATENT DOCUMENTS

CN 101074964 A 11/2007
CN 104076161 A 10/2014

(Continued)

OTHER PUBLICATIONS

Decision of Refusal issued on Oct. 2, 2020 in a counterpart Japanese patent application No. 2018-185493.

(Continued)

*Primary Examiner* — P. Kathryn Wright
*Assistant Examiner* — Curtis A Thompson
(74) *Attorney, Agent, or Firm* — Crowell & Moring LLP

(57) ABSTRACT

Disclosed is an analyzer including an analysis unit configured to analyze a specimen; a first storage part capable of storing a container capable of containing the specimen, the first storage part including an outlet that allows the container to be discharged therethrough; a second storage part capable of storing the container having been discharged through the outlet of the first storage part; a transporter configured to send out, from the second storage part, the container stored in the second storage part; and a discharge controller capable of controlling discharge of the container through the outlet of the first storage part.

20 Claims, 20 Drawing Sheets

(52) U.S. Cl.
CPC .............. *G01N 2035/0444* (2013.01); *G01N 2035/0465* (2013.01)

(58) Field of Classification Search
CPC ... G01N 2035/0465; G01N 2035/0406; G01N 35/00; G01N 35/02; G01N 2035/0498; B65G 47/145
See application file for complete search history.

(56) References Cited

U.S. PATENT DOCUMENTS

| | | | |
|---|---|---|---|
| 4,777,907 A | | 10/1988 | Sänger |
| 5,036,623 A | * | 8/1991 | Alonzo ................. B24B 31/073 451/104 |
| 5,282,414 A | * | 2/1994 | Chen ....................... A21C 9/04 99/341 |
| 6,092,977 A | * | 7/2000 | Fuchigami ............... A24C 5/34 198/531 |
| 8,734,719 B2 | | 5/2014 | Mototsu et al. |
| 9,594,089 B2 | | 3/2017 | Ootani et al. |
| 2002/0179619 A1 | * | 12/2002 | Geltser ............... B65G 47/145 221/2 |
| 2004/0116063 A1 | * | 6/2004 | Takamisawa .......... G07D 9/008 453/55 |
| 2005/0211605 A1 | * | 9/2005 | Monti .................. B65G 47/145 209/240 |
| 2006/0013729 A1 | * | 1/2006 | Carey ................... B01F 9/0025 422/63 |
| 2007/0028908 A1 | * | 2/2007 | Deak ....................... F41B 11/52 124/73 |
| 2007/0212260 A1 | * | 9/2007 | Fukuda .................. G01N 35/10 422/64 |
| 2007/0261939 A1 | * | 11/2007 | Charpentier ......... B65G 47/145 198/540 |
| 2007/0269342 A1 | * | 11/2007 | Kitagawa ............... G01N 35/04 422/64 |
| 2012/0097054 A1 | * | 4/2012 | Young .................... B30B 15/32 100/215 |
| 2012/0171078 A1 | * | 7/2012 | Kaneko .............. B65G 47/1471 422/65 |
| 2015/0279148 A1 | * | 10/2015 | Ariff .................... B65G 47/145 221/1 |

FOREIGN PATENT DOCUMENTS

| | | |
|---|---|---|
| CN | 104944172 A | 9/2015 |
| CN | 105116160 A | 12/2015 |
| EP | 3199954 A1 | 8/2017 |
| JP | S57-178014 U | 11/1982 |
| JP | H07-41148 A | 2/1995 |
| JP | H08-233830 A | 9/1996 |
| JP | H10-329930 A | 12/1998 |
| JP | 2000-118722 A | 4/2000 |
| JP | 2003-083999 A | 3/2003 |
| JP | 2007-309792 A | 11/2007 |
| JP | 2011-232353 A | 11/2011 |
| JP | 5378284 B2 | 12/2013 |
| JP | 2014-194349 | 10/2014 |
| JP | 2015-189582 A | 11/2015 |
| KR | 10-1652847 B1 | 9/2016 |

OTHER PUBLICATIONS

Communication pursuant to Article 94(3) EPC issued on Jul. 30, 2021 in European patent application No. 19198886.4.
Japanese Office Action issued on Jan. 9, 2020 in a counterpart Japanese patent application No. 2018-185493.
Extended European search report issued on Mar. 12, 2020 in a counterpart European patent application No. 19198886.4.
Japanese Office Action with English Translation, issued on Jun. 29, 2022, pp. 1-9, in Japanese patent application No. 2020-218489.
Summons to attend oral proceedings pursuant to Rule 115(1) EPC, dated Feb. 3, 2023, pp. 1-9, issued in European patent application No. 19198886.4, European Patent Office, Rijswijk, Netherlands.
Decision of Refusal with English Translation, dated Nov. 24, 2022, pp. 1-6, issued in Japanese patent application No. 2020-218489, Japan Patent Office, Chiyoda Tokyo, Japan.
Chinese Office Action issued on Jun. 29, 2023 in a counterpart Chinese patent application No. 201910927534.1.
Japanese Office Action issued on Dec. 19, 2023 in a counterpart Japanese patent application No. 2023-016599.
Chinese Office Action issued on Jan. 9, 2024 in a counterpart Chinese patent application No. 201910927534.1.
Rejection Decision issued on Apr. 24, 2024 in a counterpart Chinese patent application No. 201910927534.1, 26 pages.

* cited by examiner

LEFT ←→ RIGHT

ANALYZER AND ANALYZER CONTROL METHOD

RELATED APPLICATIONS

This application claims priority from prior Japanese Patent Application No. 2018-185493, filed on Sep. 28, 2018, entitled "Analyzer and Analyzer Control Method", the entire content of which is incorporated herein by reference.

BACKGROUND OF THE INVENTION

1. Field of the Invention

The present invention relates to an analyzer and an analyzer control method.

2. Description of the Related Art

Blood analysis such as blood coagulation analysis and immune serum analysis is usually performed by use of an analyzer. In general, in such an analyzer, a specimen in a specimen container is injected into a container to be used at the time of analysis, a reagent is injected into the container to be mixed with the specimen, the container is heated and then transported to an analysis unit, and analysis of the specimen is performed.

Containers to be used in the analyzer described above are stored in the analyzer in advance. Therefore, the analyzer includes a storage part for storing a large number of empty containers, and a transporter for transporting a container in the storage part to a specimen injector or the like.

For example, as shown in FIG. 19, the analyzer described in Japanese Laid-Open Patent Publication No. 2014-194349 includes a supply mechanism unit 500 which supplies cuvettes serving as containers. The supply mechanism unit 500 includes a storage part 501 which stores a plurality of cuvettes, and a take-out part 502 which takes out a cuvette from the storage part 501. As shown in FIG. 20, in the take-out part 502, a cuvette 504 is put on a swing rail 503 provided at the lowest portion in the storage part 501, and the swing rail 503 is swung, whereby the cuvette 504 is sent out from the storage part 501.

Meanwhile, in an analyzer, when there is no container remaining in the storage part, the user needs to supply empty containers into the storage part. From the viewpoint of reducing the burden of work for the user, the greater the storage capacity is, the better. In this regard, it is conceivable to simply increase the volume of the storage part. However, in this case, a part of a transporter, such as the above-mentioned swing rail 503, that sends out a container from the storage part may be buried with a large number of containers. Accordingly, a container could not be appropriately taken out.

Thus, it is conceivable that two storage parts are provided so as to be adjacent to each other in the analyzer, containers are first stored in a first storage part, containers in the first storage part are then transported to a second storage part as appropriate, and containers in the second storage part are sent out by the transporter. In the case of such an analyzer, while the overall storage capacity is increased by providing two storage parts, the storage amount of containers in the second storage part can be relatively reduced. Thus, it becomes possible to prevent a part of the transporter such as the swing rail 503 from being buried with containers.

However, in the case described above, a new transporter for transporting containers in the first storage part to the second storage part is required. In addition, in order to prevent a part of the above-described transporter such as the swing rail 503 from being buried with containers in the second storage part, the new transporter requires a function of adjusting the amount of containers to be transported from the first storage part to the second storage part. Accordingly, the new transporter has a complicated and large structure, which results in a large-sized analyzer.

SUMMARY OF THE INVENTION

The scope of the present invention is defined solely by the appended claims, and is not affected to any degree by the statements within this summary.

An analyzer (1) according to one aspect of the present invention includes an analysis unit (24) configured to analyze a specimen; a first storage part (131) capable of storing a container (B) capable of containing the specimen, the first storage part (131) including an outlet (150) that allows the container (B) to be discharged therethrough; a second storage part (132) capable of storing the container (B) having been discharged through the outlet (150) of the first storage part (131); a transporter (133) configured to send out, from the second storage part (132), the container (B) stored in the second storage part (132); and a discharge controller (165, 300, 310) capable of controlling discharge of the container (B) through the outlet (150) of the first storage part (131).

According to the present aspect, the analyzer (1) includes two storage parts, i.e., the first storage part (131) and the second storage part (132), and thus, the total volume of the storage part can be increased. The container (B) stored in the first storage part (131) can be discharged through the outlet (150) of a bottom portion of the first storage part (131) to be stored in the second storage part (132). In addition, the discharge controller can control the discharge of the container (B) through the outlet (150), thereby adjusting the amount of the container (B) to be stored in the second storage part (132). Accordingly, there is no need to separately provide a new transporter that transports the container (B) from the first storage part (131) to the second storage part (132). Thus, increase in size of the analyzer (1) can be suppressed. It should be noted that the "container (B) capable of containing a specimen" encompasses a container in which a substance other than a specimen is mixed with the specimen.

The second storage part (132) may be capable of storing the container (B) having dropped through the outlet (150) of the first storage part (131), and the discharge controller (165, 300, 310) may be capable of controlling drop of the container (B) through the outlet (150) of the first storage part (131).

According to the present aspect, the container can be discharged by use of dropping thereof from the first storage part (131), and discharge of the container can be controlled. Thus, the configuration of the analyzer (1) can be simplified. It should be noted that "drop" may be any act of falling due to gravity, and encompasses not only a case where the container (B) directly falls through the outlet (150) into the second storage part (132) but also a case where the container (B) falls via a transport path or the like provided between the outlet 150 of the first storage part (131) and the second storage part (132).

An example of the discharge controller may include a vibration providing mechanism (166) configured to provide vibration to the container (B) stored in the first storage part (131).

According to the present aspect, in a state where a plurality of containers (B) are stored in the first storage part (131) and the containers (B) are congested due to natural friction force among the containers (B), it is possible, by means of the vibration providing mechanism (166), to provide vibration to the plurality of containers (B) stored in the first storage part, and to cause the containers (B) to drop through the outlet (150) of the first storage part (131) due to the vibration. As a result, dropping of the containers (B) through the outlet (150) of the first storage part (131) can be appropriately controlled.

The vibration providing mechanism (166) may provide vibration in an upward direction with respect to the first storage part (131).

According to the present aspect, vibration can be provided in the opposite direction of gravity, to the containers (B) stored in the first storage part (131). This facilitates movement of the containers (B) congested in the first storage part (131). Thus, dropping of the containers (B) through the outlet (150) of the first storage part (131) can be appropriately controlled.

The vibration providing mechanism (166) may include a vibration plate (153) provided in a vicinity of the outlet (150) of the first storage part (131), and a vibration member (160) configured to vibrate the vibration plate (153).

According to the present aspect, vibration is provided from the vibration plate (153) having a plate shape, to the containers (B) in the vicinity of the outlet (150) of the first storage part (131). Therefore, the vibration is effectively transmitted, and dropping of the containers (B) through the outlet (150) of the first storage part (131) can be appropriately controlled.

The vibration plate (153) may form at least a part of a bottom portion of the first storage part (131).

According to the present aspect, a bottom portion that is in contact with the containers (B) stored in the first storage part (131) vibrate. Thus, the vibration of the vibration plate (153) is directly transmitted to the containers (B), and dropping of the containers (B) through the outlet (150) can be appropriately controlled.

The vibration plate (153) may form at least a part of an edge of the outlet (150).

According to the present aspect, at least a part of the edge of the outlet (150) vibrates. Accordingly, the vibration is directly transmitted to the containers (B) in the vicinity of the outlet (150), and dropping of the containers (B) through the outlet (150) can be appropriately controlled.

The vibration plate (153) may have an upper face (153c) opposed to an interior of the first storage part (131), and a side face (153d) opposed to the outlet (150). The upper face (153c) and the side face (153d) may be smoothly connected to each other at an upper end of the edge of the outlet (150).

The container (B) could collide with the upper end of the edge of the outlet (150) of the vibration plate (153) when dropping through the outlet (150). However, according to the present aspect, the upper face (153c) and the side face (153d) are smoothly connected to each other at the upper end of the edge of the outlet (150). Accordingly, the container (B) can be prevented from being damaged when colliding with the upper end of the edge of the outlet (150).

The vibration member (160) may be provided at a back face, of the vibration plate (153), which is not opposed to an interior of the first storage part (131).

According to the present aspect, the container (B) does not hit the vibration member (160) and the vibration member (160) is protected. Therefore, the container (B) and the vibration member (160) can be prevented from being damaged.

An example of the discharge controller may include a rotation mechanism (303) provided in a vicinity of the outlet (150) of the first storage part (131) and configured to perform rotation drive.

According to the present aspect, in a state where a plurality of containers (B) are stored in the first storage part (131) and the containers (B) are congested due to natural friction force among the containers (B), when the rotation mechanism (303) rotates, it is possible to provide vibration and direct force to the plurality of containers (B) stored in the first storage part (131), and to cause the containers (B) to be discharged through the outlet (150) of the first storage part (131) due to external force such as the vibration. As a result, discharge of the containers (B) through the outlet (150) of the first storage part (131) can be appropriately controlled.

The outlet (150) may have dimensions that satisfy a relationship of $L<D<2\times L$ when a maximum dimension of the container (B) is defined as L and a maximum opening dimension of the outlet (150) is defined as D.

According to the present aspect, the containers (B) easily remain in the vicinity of the outlet (150). Thus, dropping of the containers (B) can be appropriately inhibited. Accordingly, the amount of the container (B) to be discharged to the second storage part (132) can be appropriately restricted.

The first storage part (131) may be configured to be able to store a greater number of the containers (B) than the second storage part (132).

According to the present aspect, the storage capacity of the second storage part (132) is relatively small. Thus, it is possible to inhibit occurrence of a state where the transporter (133) of the second storage part (132) is buried with containers (B) and cannot perform transport. Meanwhile, since the storage capacity of the first storage part (131) is relatively large, the total volume of the two storage parts can be increased.

The analyzer (1) may further include a housing configured to cover a body of the analyzer, and the housing may be provided with a lid (171) that allows access to the second storage part (132).

According to the present aspect, if an excessive amount of containers (B) have entered the second storage part (132), it is possible to take out excess containers (B) in the second storage part (132) to the outside of the housing by opening the lid (171). Accordingly, maintenance work is facilitated.

The analyzer (1) may further include a sensor (260) capable of detecting a state of transport of the container (B) by the transporter (133); and a controller (26) programmed to control operation of the discharge controller on the basis of a detection result, by the sensor (260), of the state of transport of the container (B).

According to the present aspect, the state of transport of the container (B) from the second storage part (132) by the transporter (133) can be detected by use of the sensor. Then, on the basis of the state of transport, operation of the discharge controller can be controlled to adjust discharge of the container (B) through the outlet (150) of the first storage part (131) into the second storage part (132). As a result, the amount of the container (B) stored in the second storage part (132) can be more strictly controlled.

The analyzer (1) may further include a loading part (130) configured to allow the container (B) to be loaded into the first storage part (131).

According to the present aspect, the container (B) can be appropriately loaded into the first storage part (131).

An analyzer according to one aspect of the present invention includes an analysis unit configured to analyze a specimen contained in a sample container; a first storage container having an internal space in which a plurality of sample containers are stored, a hole being formed at a part of a bottom of the first storage container; a second storage container having an internal space smaller than the internal space of the first storage container, the second storage container being arranged below the hole of the first storage container and an opening being formed at an upper part of the second storage container; a transporter configured to send out, from the second storage container, the sample container stored in the second storage container; and a vibration member configured to vibrate the bottom of the first storage container.

A control method for an analyzer (1) according to one aspect of the present invention includes discharging a container (B) capable of containing a specimen, from a first storage part (131) storing the container (B); storing, into a second storage part (132), the container (B) having been discharged from the first storage part (131); and controlling the discharging of the container (B) from the first storage part (131).

According to the present aspect, the container (B) is stored in two storage parts, i.e., the first storage part (131) and the second storage part (132). Thus, the total volume of the storage part can be increased. The container (B) stored in the first storage part (131) can be discharged through the outlet (150) of a bottom portion of the first storage part (131) to be stored in the second storage part (132). In addition, through controlling the discharging, discharging of the container (B) through the outlet (150) can be controlled, thereby adjusting the amount of the container (B) to be stored in the second storage part (132). Accordingly, there is no need to separately provide a new transporter that transports the container (B) from the first storage part (131) to the second storage part (132). Thus, increase in size of the analyzer (1) can be suppressed.

The controlling of the discharging may be performed by providing vibration to the container (B) stored in the first storage part (131).

According to the present aspect, vibration can be provided to a plurality of containers (B) stored in the first storage part, and the containers (B) can be discharged through the outlet (150) of the first storage part (131) due to the vibration. As a result, discharging of the containers (B) through the outlet (150) of the first storage part (131) can be appropriately controlled.

The controlling of the discharging may be performed by providing vibration in an upward direction with respect to the first storage part (131).

According to the present aspect, vibration can be provided in the opposite direction of gravity, to the container (B) stored in the first storage part (131). This facilitates movement of the container (B) remaining in the first storage part (131). Thus, discharging of the container (B) through the outlet (150) of the first storage part (131) can be appropriately controlled.

The controlling of the discharging may be performed by causing a rotation mechanism (303) to perform rotation drive.

According to the present aspect, when the rotation mechanism (303) rotates, it is possible to provide vibration and direct force to a plurality of containers (B) stored in the first storage part (131), and to cause the containers (B) to be discharged through the outlet (150) of the first storage part (131) due to external force such as the vibration. As a result, discharging of the containers (B) through the outlet (150) of the first storage part (131) can be appropriately controlled.

The controlling of the discharging may be performed on the basis of a state of transport of the container (B).

According to the present aspect, the amount of the container (B) stored in the second storage part (132) can be more accurately controlled.

DETAILED DESCRIPTION OF THE PREFERRED EMBODIMENTS

Figure 1:
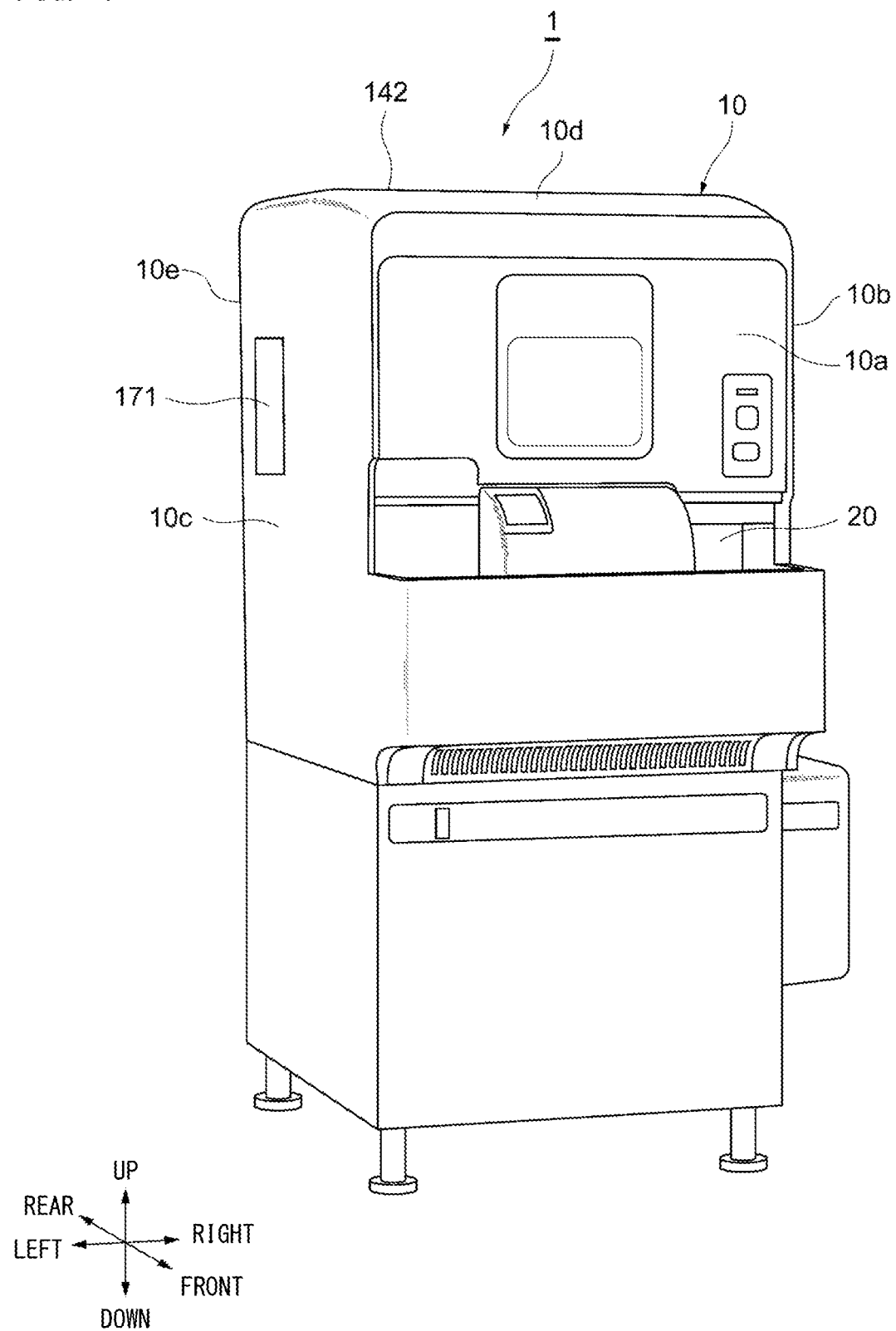
FIG. 1 is a perspective view showing one example of a configuration an analyzer.

Hereinafter, a preferred embodiment of the present disclosure will be described with reference to the drawings. The same elements are denoted by the same reference character, and redundant description is omitted. The positional relationship such as up, down, right, and left are based on the positional relationship shown in the drawings, unless otherwise specified. Further, the dimensional proportions in the drawings are not limited to the proportions shown therein.

The embodiment below is merely an example for describing the present disclosure, and the present disclosure is not limited to this embodiment.

<Configuration of Analyzer>

Figure 2:
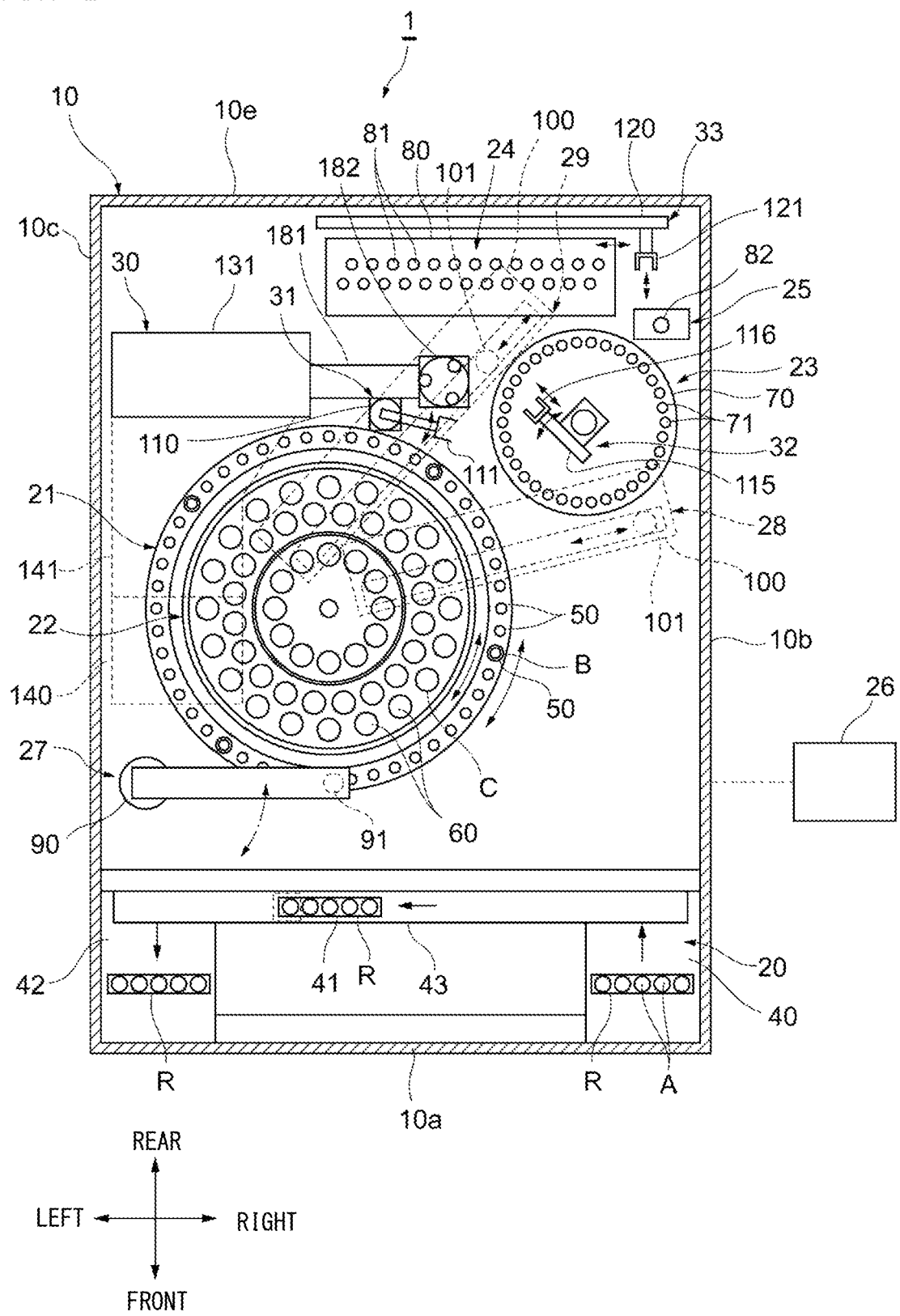
FIG. 2 illustrates a horizontal cross-section showing the outline of an internal configuration of the analyzer.

FIG. 1 is a perspective view showing one example of an external view of an analyzer 1 according to the present embodiment. FIG. 2 is a schematic diagram showing a configuration of the inside of the analyzer 1.

The analyzer 1 is configured to automatically analyze a specimen such as blood. As shown in FIG. 1, the analyzer 1 includes a housing 10 having a substantially rectangular parallelepiped outer shape. For example, the housing 10 includes a front wall 10a, a side wall 10b on the right side when viewed from the front, a side wall 10c on the left side when viewed from the front, a ceiling wall 10d, and a rear wall 10e.

As shown in FIG. 2, the analyzer 1 includes a specimen container sending-in unit 20 which sends in a specimen container A into the housing 10; a first table 21 which holds, in an annular shape, a plurality of cuvettes B serving as containers each capable of containing a specimen; a second table 22 which holds a plurality of reagent containers C each containing a reagent to be mixed with a specimen; a heating unit 23 which holds and heats a cuvette B; an analysis unit 24 which holds a cuvette B and analyzes an analysis sample (obtained by mixing a specimen and a reagent) in the cuvette B; a discharge part 25 for discharging a cuvette B that has been subjected to analysis; a controller 26; and the like.

In addition, the analyzer 1 includes, as devices that each inject a liquid into a cuvette B a specimen injection arm 27 which injects, into a cuvette B on the first table 21, a specimen in a specimen container A having been sent into the specimen container sending-in unit 20; two reagent injection devices 28, 29 each of which injects, into a cuvette B, a reagent in a reagent container C on the second table 22; and the like.

Further, the analyzer 1 includes, as devices that each transport a cuvette B, a cuvette supply device 30 which supplies a cuvette B to the apparatus body; a first transport arm 31 which transports, to the first table 21, the cuvette B supplied by the cuvette supply device 30; a second transport arm 32 which transports the cuvette B on the first table 21 to the first reagent injection device 28 and the heating unit 23; a third transport arm 33 which transports the cuvette B in the heating unit 23 to the second reagent injection device 29, the analysis unit 24, and the discharge part 25; and the like.

In a plan view, the specimen container sending-in unit 20 is disposed on the front side in the housing 10, and the first table 21 and the second table 22 are disposed in the vicinity of the center in the housing 10. The heating unit 23 is disposed on the right side in the housing 10, and the analysis unit 24 is disposed on the rear side. The discharge part 25 is disposed between the heating unit 23 and the analysis unit 24. The cuvette supply device 30 is disposed on the left side in the housing 10, between the analysis unit 24 and the first table 21.

The specimen container sending-in unit 20 includes a rack sending-in unit 40 which sends in a rack R holding a plurality of specimen containers A; a specimen suction unit 41 which is accessible by the specimen injection arm 27 and at which a specimen is suctioned from each specimen container A in the rack R by the specimen injection arm 27; a rack sending-out unit 42 which sends out the rack R holding the specimen containers A from which the specimens have been suctioned; and a transport device 43 which transports the rack R in the order of the rack sending-in unit 40, the specimen suction unit 41, and a rack sending-out unit 42. The transport device 43 transfers the rack R by using a conveyer, for example.

The first table 21 has a circular shape and is configured to be rotatable by a drive unit (not shown). The first table 21 includes a plurality of cuvette holders 50 each configured to hold a cuvette B. The cuvette holders 50 are arranged at equal intervals over the entire circumference of the first table 21 in the circumferential direction.

Figure 3:
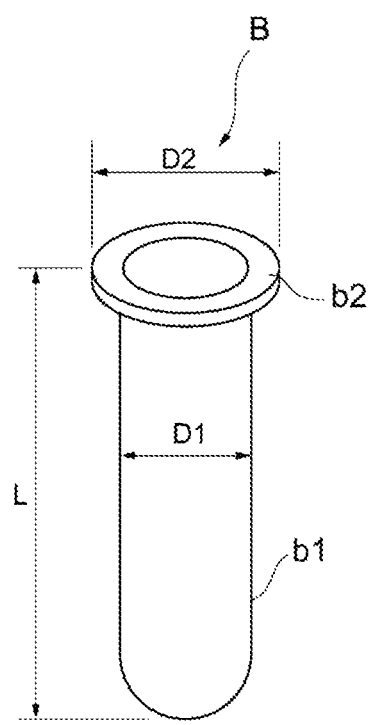
FIG. 3 is a perspective view showing one example of a cuvette.

As shown in FIG. 3, the cuvette B includes a trunk portion b1 for holding a liquid; and a flange b2 provided near the inlet of the trunk portion b1. The flange b2 protrudes radially outward from an upper portion of the trunk portion b1, and has a greater outer diameter than the trunk portion b1. The cuvette B has a longitudinal dimension of about 30 mm, for example. The trunk portion b1 has an outer diameter D1 of about 8 mm. The flange b2 has an outer diameter D2 of about 10 mm. Each cuvette holder 50 shown in FIG. 2 has a hole having a diameter that is greater than the outer diameter D1 of the trunk portion b1 of the cuvette B and that is smaller than the outer diameter D2 of the flange b2. The cuvette holder 50 can hold a cuvette B, with the trunk portion b1 of the cuvette B accommodated in this hole.

The second table 22 is disposed inside the first table 21. The second table 22 has a disk shape, and is configured to be rotatable by a drive unit (not shown). The second table 22 includes a plurality of reagent container holders 60 each configured to hold a reagent container C. The reagent container holders 60 are arranged in multiple concentric circles. The reagent container holders 60 are arranged at equal intervals along the circumferential direction, for example.

The heating unit 23 has a heating plate 70 of a circular shape. The heating plate 70 has a plurality of cuvette holders 71 each configured to hold a cuvette B. The cuvette holders 71 are arranged at equal intervals over the entire circumference near the outermost periphery of the heating plate 70, for example. The heating plate 70 has a heat source (not shown), and can heat the liquids in the cuvettes B held in the cuvette holders 71, to a predetermined temperature.

The analysis unit 24 has an analysis plate 80 of a rectangular shape. The analysis plate 80 has a plurality of cuvette holders 81 each configured to hold a cuvette B. The cuvette holders 81 are arranged in a plurality of rows along the longitudinal direction of the analysis plate 80, for example. The analysis unit 24 has a light applicator and a light receiver (not shown). Light is applied from the light applicator to a cuvette holder 81, the light having passed through the analysis liquid in the cuvette B is received by the light receiver, and on the basis of the result of the received light, the specimen can be analyzed.

The discharge part 25 includes a discharge hole 82 through which a cuvette B is discharged. The discharge hole 82 is in communication with a cuvette collection unit (not shown) provided at a lower portion of the housing 10.

In a plan view, the specimen injection arm 27 is disposed between the first table 21 and the specimen suction unit 41 of the specimen container sending-in unit 20 in the housing 10. The specimen injection arm 27 includes a drive unit 90 which drives the specimen injection arm 27; and a nozzle 91 which injects and suctions a specimen.

For example, the drive unit 90 includes a rotation drive unit which causes the specimen injection arm 27 to rotate in the planar direction between the specimen suction unit 41 and the first table 21; and an up-down drive unit which causes the specimen injection arm 27 to move in the up-down direction. The nozzle 91 is provided at a leading end portion of the specimen injection arm 27, and can suction and inject a specimen by means of a pump or the like (not shown). According to such a configuration, the specimen injection arm 27 can access a specimen container A in the specimen suction unit 41, suction a specimen, move to a position above the first table 21, and inject the specimen into a cuvette B on the first table 21.

The reagent injection device 28, 29 has a slender arm 100 in a plan view, and includes a nozzle 101 in a lower portion thereof. The arm 100 of the first reagent injection device 28 extends from above the second table 22 to the vicinity of the heating unit 23. The arm 100 of the second reagent injection device 29 extends from the second table 22 to the vicinity of the analysis unit 24. Each arm 100 is fixed to the ceiling of the housing 10, for example.

The nozzle 101 is configured to be movable in the longitudinal direction of the arm 100 and the up-down direction with respect to the arm 100, by a drive unit (not shown). The nozzle 101 of the first reagent injection device 28 is movable along the arm 100 from above the second table 22 to the vicinity above the heating plate 70 of the heating unit 23. The nozzle 101 of the second reagent injection device 29 is movable along the arm 100 from above the second table 22 to the vicinity above the analysis plate 80 of the analysis unit 24. Each nozzle 101 can suction and inject a reagent by means of a pump or the like (not shown). The nozzle 101 includes a heat source and can heat the suctioned reagent to a predetermined temperature. According to such a configuration, the nozzle 101 of the first reagent injection device 28 can access a reagent container C on the second table 22, suction a reagent, move to the vicinity above the heating plate 70, and inject the reagent into a cuvette B held by the second arm 32 in the vicinity of the heating plate 70. The nozzle 101 of the second reagent injection device 29 can access a reagent container C on the second table 22, suction a reagent, move to the vicinity above the analysis plate 80, and inject the reagent to a cuvette B held by the third arm 33 in the vicinity of the analysis plate 80.

The cuvette supply device 30 is configured to store empty cuvettes B having been loaded from outside, and sequentially supply the cuvettes B to a cuvette sending-out part 182 described later. Details of the configuration of the cuvette supply device 30 will be described later.

In a plan view, the first arm 31 is disposed between the first table 21 and a transport path 181 described later of the cuvette supply device 30 as shown in FIG. 2, for example. The first arm 31 includes a drive unit 110 which drives the first arm 31; and a cuvette holder 111 configured to hold a cuvette B. For example, the drive unit 110 includes a rotation drive unit which causes the first arm 31 to rotate in the planar direction between the first table 21 and the cuvette sending-out part 182 of the cuvette supply device 30; and an up-down drive unit which causes the first arm 31 to move in the up-down direction. The cuvette holder 111 is provided at a leading end portion of the first arm 31, has a U-shape, for example, and can hold a cuvette B by supporting, from below, the flange b2 of the cuvette B. According to such a configuration, the first arm 31 can hold a cuvette B in the cuvette sending-out part 182 of the cuvette supply device 30, move the cuvette B to a position above the first table 21, and place the cuvette B into a cuvette holder 50 of the first table 21.

The second arm 32 is disposed at the heating plate 70 of the heating unit 23, for example. The second arm 32 includes a drive unit 115 which drives the second arm 32; and a cuvette holder 116 configured to hold a cuvette B. For example, the drive unit 115 includes a rotation drive unit which causes the second arm 32 to rotate in the planar direction between the first table 21 and the heating plate 70; an up-down drive unit which causes the second arm 32 to move in the up-down direction; and an extension/contraction drive unit which causes the second arm 32 to extend/contract in the horizontal direction. The cuvette holder 116 is provided at a leading end portion of the second arm 32, has a U-shape, for example, and can hold a cuvette B by supporting, from below, the flange b2 of the cuvette B. According to such a configuration, the second arm 32 can hold a cuvette B in a cuvette holder 50 of the first table 21, move the cuvette B to a position below the nozzle 101 of the first reagent injection device 28, or move the cuvette B to a cuvette holder 71 of the heating plate 70.

In a plan view, the third arm 33 is disposed to a rear side of the analysis unit 24 in the housing 10. The third arm 33 includes a drive unit 120 which drives the third arm 33; and a cuvette holder 121 configured to hold a cuvette B. The drive unit 120 includes a drive mechanism which moves the third arm 33 in the right-left direction, the front-rear direction, and the up-down direction. The cuvette holder 121 is provided at a leading end portion of the third arm 33, has a U-shape, for example, and can hold a cuvette B by supporting, from below, the flange b2 of the cuvette B. According to such a configuration, the third arm 33 can hold a cuvette B in a cuvette holder 71 of the heating plate 70, move the cuvette B to a position below the nozzle 101 of the second reagent injection device 29, or move the cuvette B to a cuvette holder 81 of the analysis unit 24. The third arm 33 can transport a cuvette B having been subjected to analysis, to the discharge part 25.

<Configuration of Cuvette Supply Device>

Figure 4:
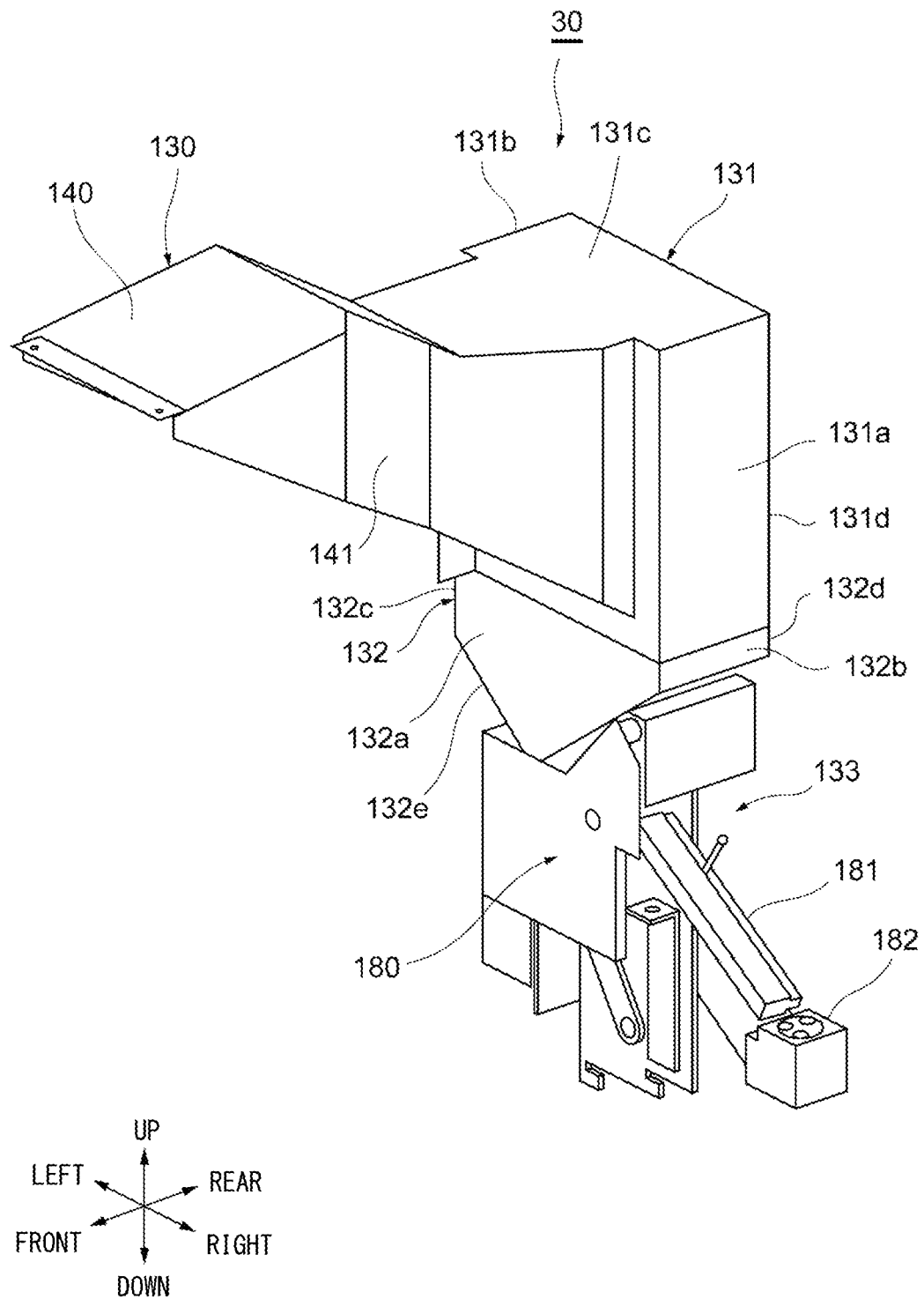
FIG. 4 is a perspective view showing one example of an external view of a cuvette supply device.

FIG. 4 is a schematic perspective view showing a configuration of the cuvette supply device 30. For example, the cuvette supply device 30 includes a loading part 130 through which empty cuvettes B are loaded; a first storage part 131 which stores the cuvettes B loaded from the loading part 130; a second storage part 132 which stores cuvettes B discharged from the first storage part 131; and a transporter 133 which transports cuvettes B from the second storage part 132.

Figure 5:
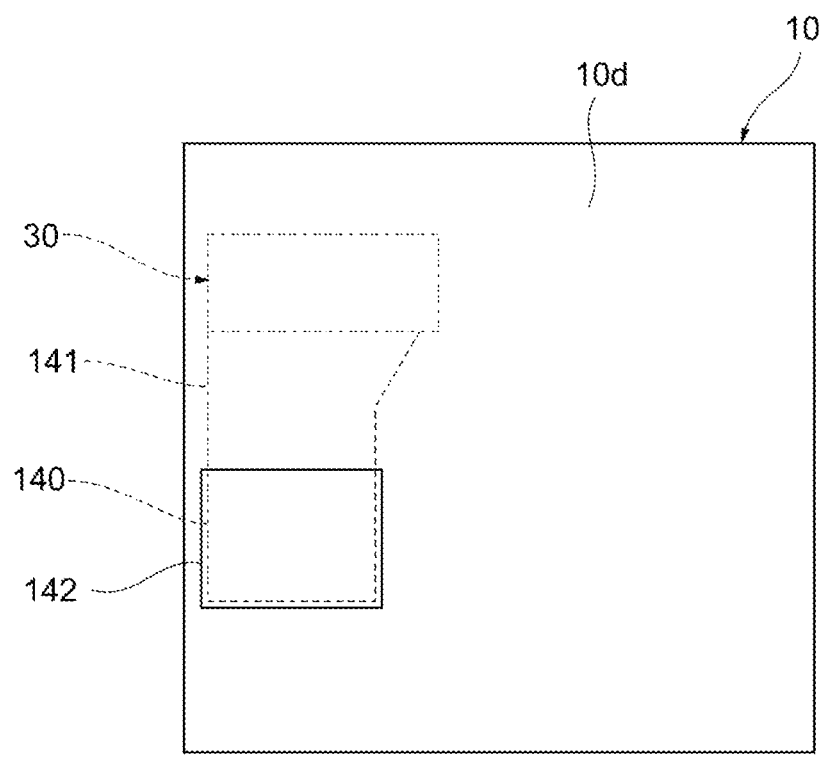
FIG. 5 illustrates the upper face of the analyzer.
Figure 5:
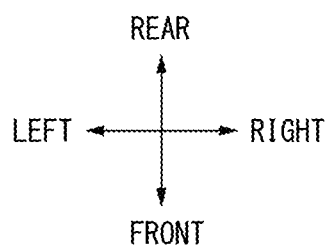
Figure 6:
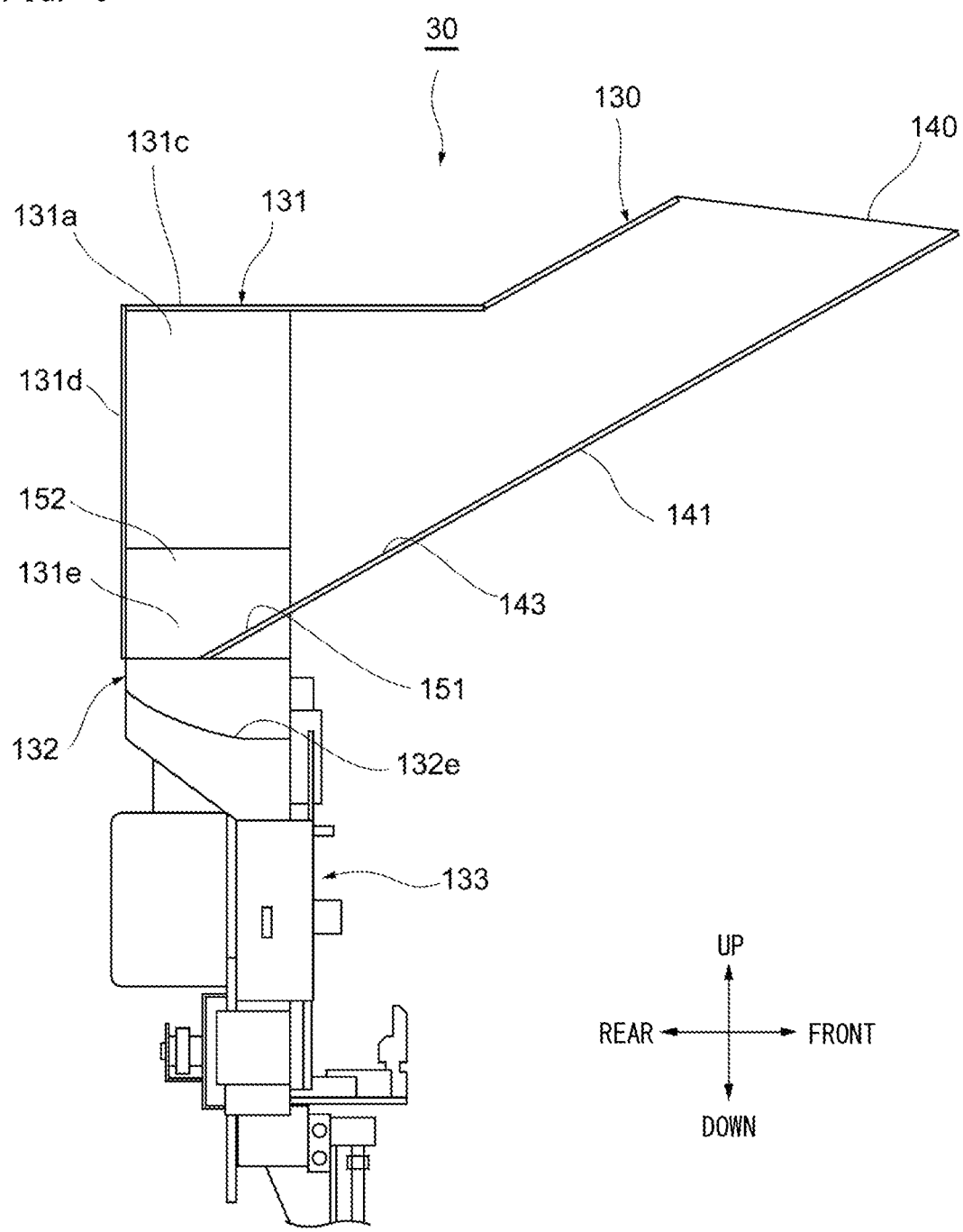
FIG. 6 illustrates a vertical cross-section showing one example of an internal configuration of a loading part of the cuvette supply device.

For example, the loading part 130 includes an inlet 140 having a quadrangular shape; and a transport path 141 extending from the inlet 140 to the first storage part 131. As shown in FIG. 5, when a lid 142 provided at the ceiling wall 10d of the housing 10 is opened, the inlet 140 is open in the upper face of the housing 10. The transport path 141 extends in a direction from the front side toward the rear side of the housing 10. The transport path 141 has a substantially quadrangular shape in a vertical cross-section, which is perpendicular to the extending direction. As shown in FIG. 6, the transport path 141 has a bottom face 143 that is gradually downwardly inclined from the inlet 140 toward the first storage part 131.

Figure 7:
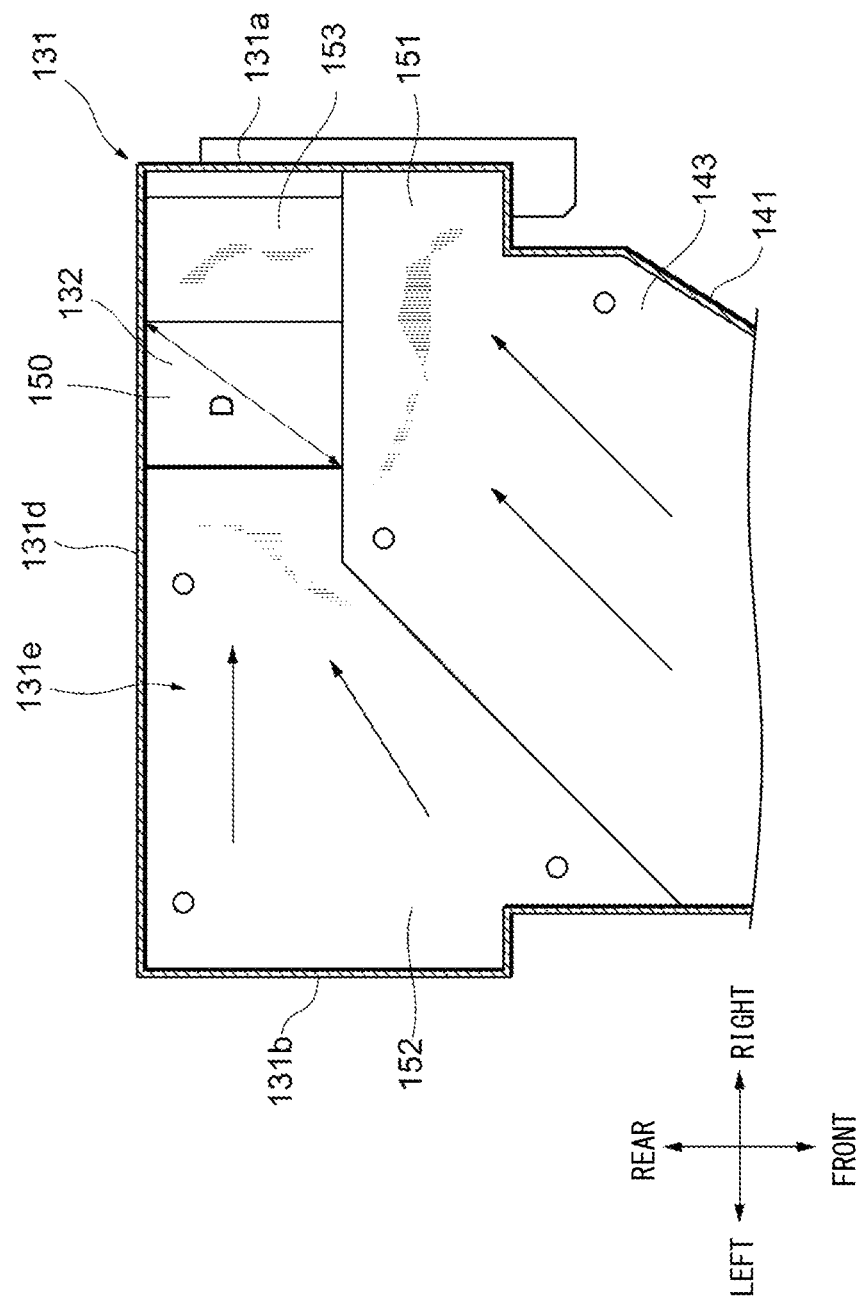
FIG. 7 illustrates a horizontal cross-section showing one example of an internal configuration of a first storage part of the cuvette supply device.
Figure 8:
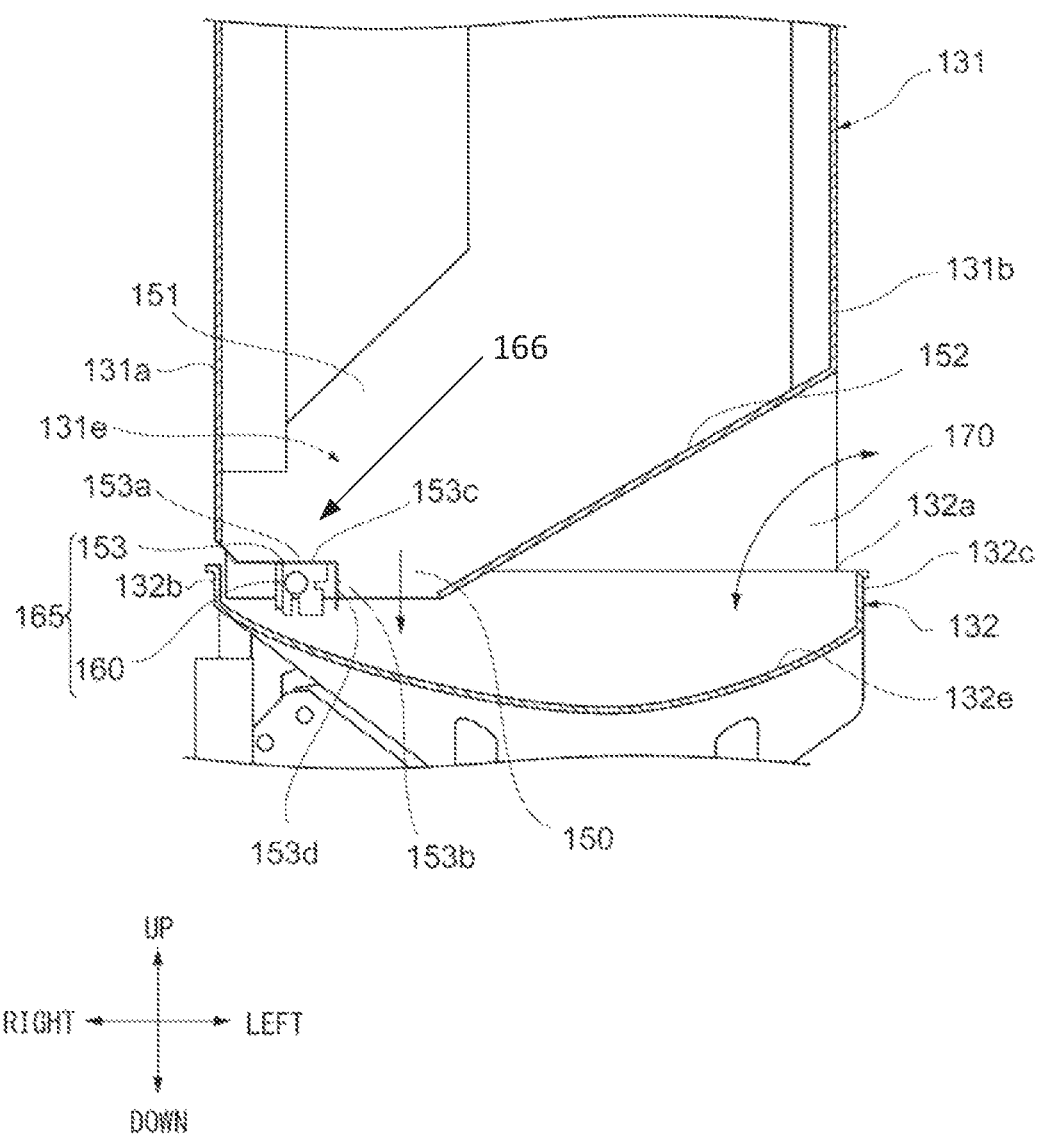
FIG. 8 illustrates a vertical cross-section showing one example of internal configurations of the first storage part and a second storage part viewed from the rear side.
Figure 9:
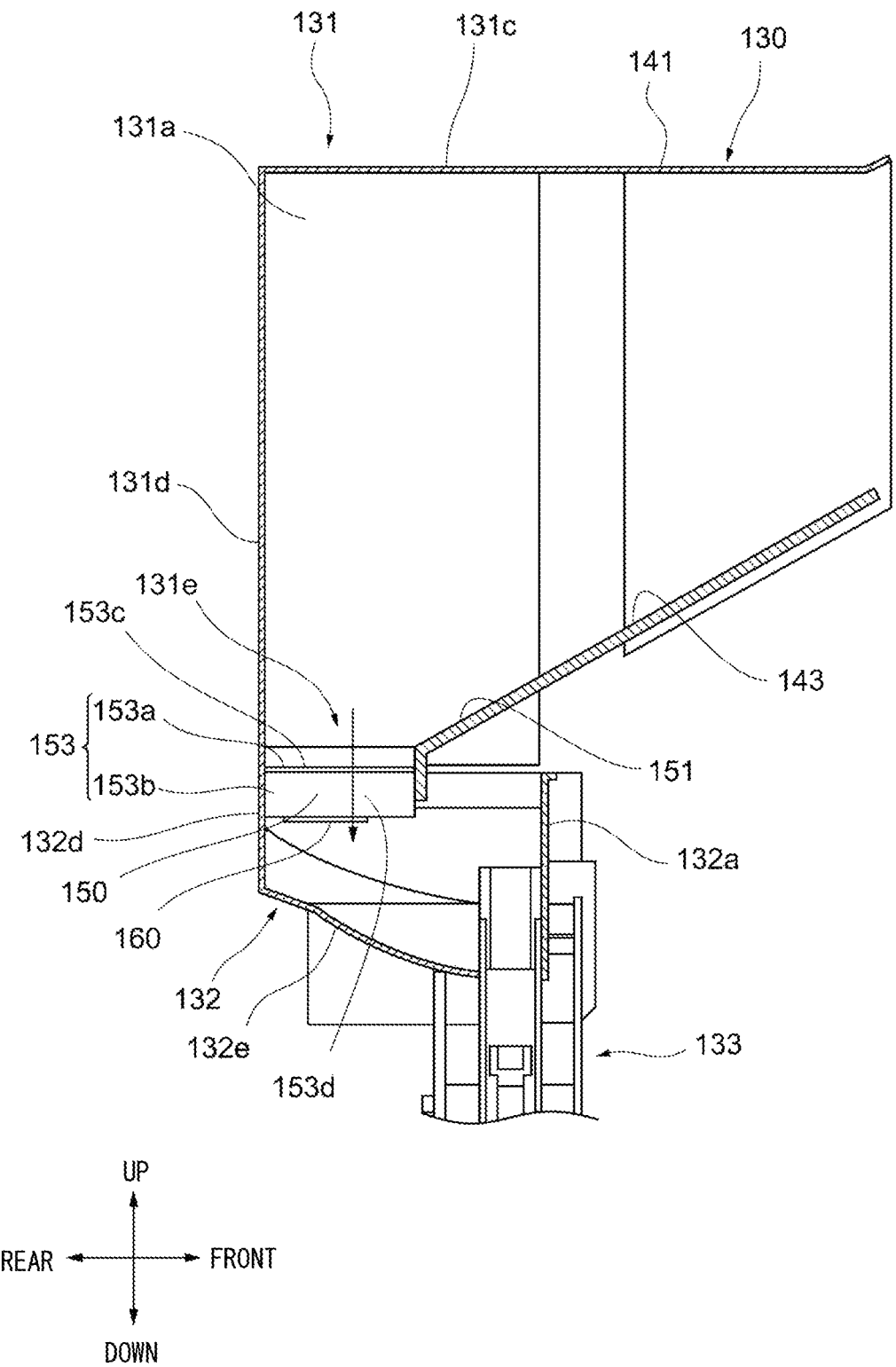
FIG. 9 illustrates a vertical cross-section showing one example of internal configurations of the first storage part and the second storage part viewed from the left side.

As shown in FIG. 4, the first storage part 131 has a rectangular parallelepiped outer shape. For example, the first storage part 131 includes a side wall 131a on the right side when viewed from the front; a side wall 131b on the left side when viewed from the front; a ceiling wall 131c; and a rear wall 131d. The face on the front side of the first storage part 131 is open, and is connected to the transport path 141. As shown in FIG. 7 and FIG. 8, the first storage part 131 has a bottom portion 131e. FIG. 7 illustrates a horizontal cross-section showing an internal configuration of the first storage part 131. FIG. 8 illustrates a vertical cross-section showing internal configurations of the first storage part 131 and the second storage part 132 viewed from the rear side of the housing 10. FIG. 9 illustrates a vertical cross-section showing internal configurations of the first storage part 131 and the second storage part 132 viewed from the left side of the housing 10.

As shown in FIG. 7, the bottom portion 131e has a rectangular shape that is long in the right-left direction in a plan view. For example, the bottom portion 131e includes an outlet 150, a first inclined plate 151, a second inclined plate 152, and a vibration plate 153.

For example, the outlet 150 has a quadrangular shape, and is open to the second storage part 132 below. The outlet 150 is adjacent to the rear wall 131d and is disposed at a position closer to the side wall 131a on the right side relative to the center in the right-left direction. The outlet 150 has dimensions that satisfy the relationship of L<D<3×L, preferably, the relationship of L<D<2×L, when the maximum dimension (the longitudinal dimension shown in FIG. 3) of the cuvette B is defined as L and the maximum dimension (the dimension of the diagonal line) of the outlet is defined as D.

As shown in FIG. 7 to FIG. 9, the first inclined plate 151 is provided on the front side of the first storage part 131 and is smoothly continuous with the bottom face 143 of the transport path 141. As shown in FIG. 7 and FIG. 9, the first inclined plate 151 is inclined gradually downwardly toward the outlet 150 which is on the right side relative to the center in the right-left direction.

As shown in FIG. 7 and FIG. 8, the second inclined plate 152 is provided on the left side-wall 131b side in the first storage part 131, and is inclined gradually downwardly from the left side-wall 131b toward the outlet 150. In order to facilitate sliding of cuvettes B, a resin that causes less friction force (for example, polyacetal) is used for the first inclined plate 151 and the second inclined plate 152.

As shown in FIG. 7, the vibration plate 153 has a rectangular shape, for example, and forms a part of the bottom portion 131e. The vibration plate 153 extends in the horizontal direction from the right side-wall 131a toward the outlet 150. The vibration plate 153 has a configuration, such as having a thin plate shape or being made from a material having a high elastic modulus, that easily vibrates compared to the other surrounding parts.

As shown in FIG. 8, the vibration plate 153 has an L-shape, for example. The vibration plate 153 includes a horizontal portion 153a extending from the right side-wall 131a toward the outlet 150 side; and a perpendicular portion 153b extending downwardly from the leading end of the horizontal portion 153a. The perpendicular portion 153b is opposed to the outlet 150, and forms a part of the edge of the outlet 150. An upper face 153c of the horizontal portion 153a serves as the upper face opposed to the interior of the first storage part 131. An outer side face 153d of the perpendicular portion 153b serves as the side face opposed to the outlet 150. The upper face 153c of the horizontal portion 153a and the outer side face 153d of the perpendicular portion 153b are smoothly connected to each other at the upper edge of the edge of the outlet 150.

A vibration member 160 that vibrates in the up-down direction is provided at the back face of the vibration plate 153. The vibration member 160 is a vibration actuator that vibrates by being fed with electricity, for example. Vibration of the vibration member 160 can be controlled by the controller 26. The vibration member 160 causes the vibration plate 153 to vibrate, thereby being able to drop cuvettes B stored in the first storage part 131, through the outlet 150 into the second storage part 132. In the present embodiment, the vibration plate 153 and the vibration member 160 form a vibration providing mechanism 166, which forms a discharge controller that controls dropping of cuvettes B from the first storage part 131 to the second storage part 132.

As shown in FIG. 4, FIG. 8, and FIG. 9, the second storage part 132 is provided immediately below the first storage part 131. The second storage part 132 has a smaller storage capacity than the first storage part 131.

As shown in FIG. 4, the second storage part 132 has a front wall 132a; a side wall 132b on the right side when viewed from the front; a side wall 132c on the left side when viewed from the front; a rear wall 132d; and a bottom wall 132e.

Figure 10:
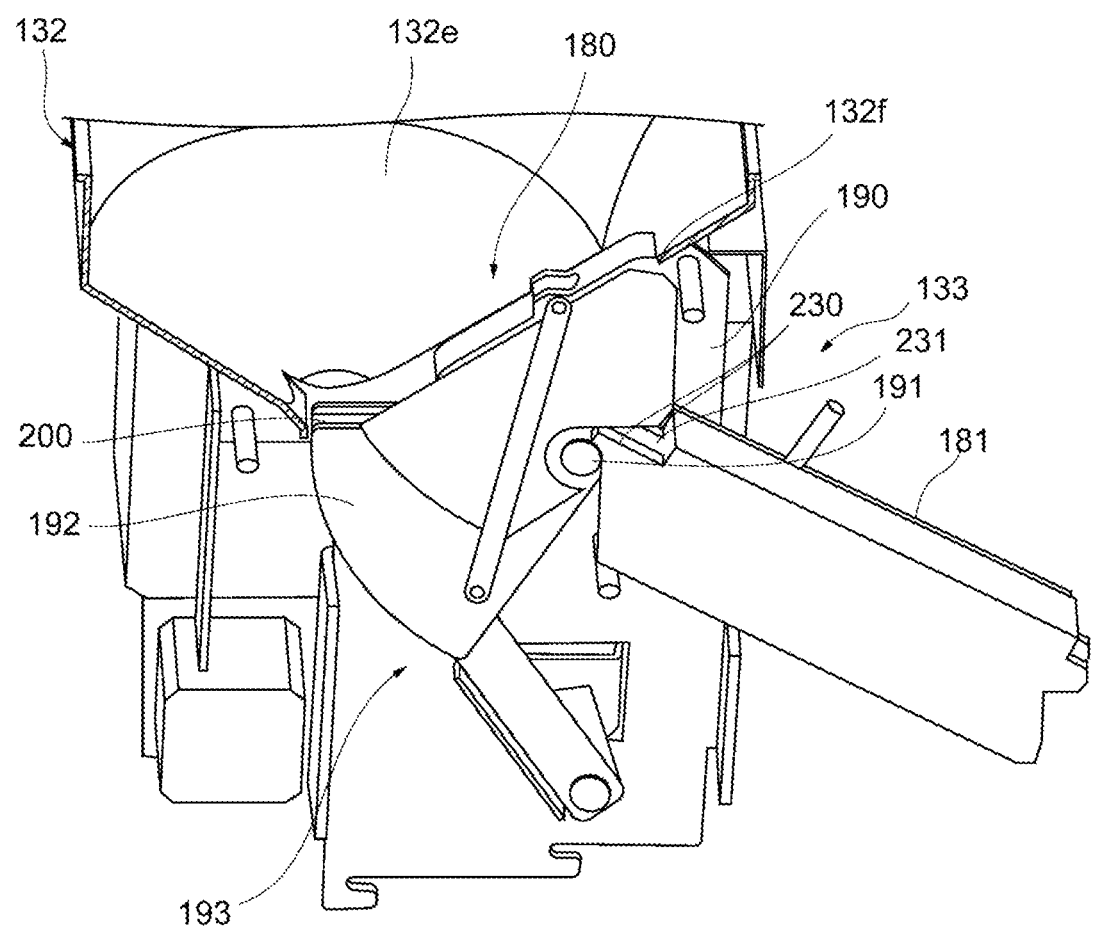
FIG. 10 illustrates one example of inner structures of the second storage part and a transporter.

As shown in FIG. 10, the bottom wall 132e has an inclined face having an inverted cone shape (mortar shape) of which the center portion is at the lowest position thereof.

Figure 11:
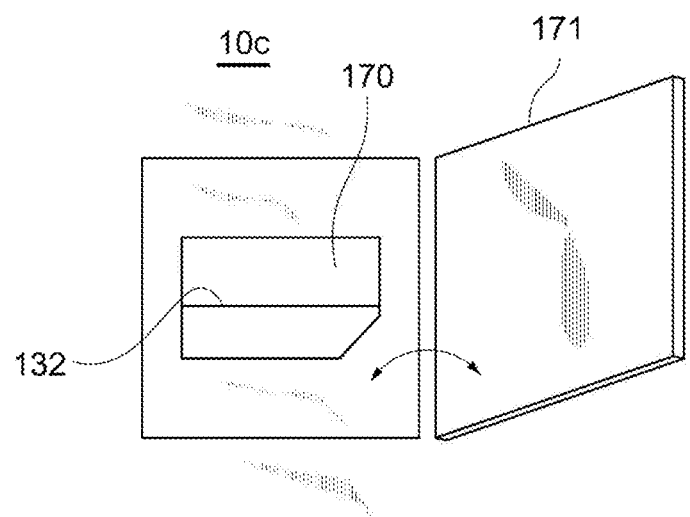
FIG. 11 illustrates a lid, of a housing, that allows access to the second storage part.

The upper face of the second storage part 132 is open, and is exposed to the bottom portion 131e of the first storage part 131. Accordingly, as shown in FIG. 8, the upper face on the left side when viewed from the rear of the second storage part 132 is exposed to the second inclined plate 152 of the bottom portion 131e, and immediately below the second inclined plate 152, an empty space 170 that allows access to the second storage part 132 from outside is formed. As shown in FIG. 1, an openable lid 171 is provided at the left side-wall 10c, of the housing 10, which corresponds to the empty space 170 on the left side of the second storage part 132. When the lid 171 is opened as shown in FIG. 11, the second storage part 132 can be accessed from outside of the housing 10.

The transporter 133 shown in FIG. 4 takes out cuvettes B in the second storage part 132 and sequentially transports the cuvettes B to the cuvette sending-out part 182.

For example, the transporter 133 includes a taking-out mechanism 180 which takes out a cuvette B in the second storage part 132; the transport path 181 for transporting the cuvette B taken out by the taking-out mechanism 180; and the cuvette sending-out part 182 which holds the cuvette B transported through the transport path 181.

Figure 12:
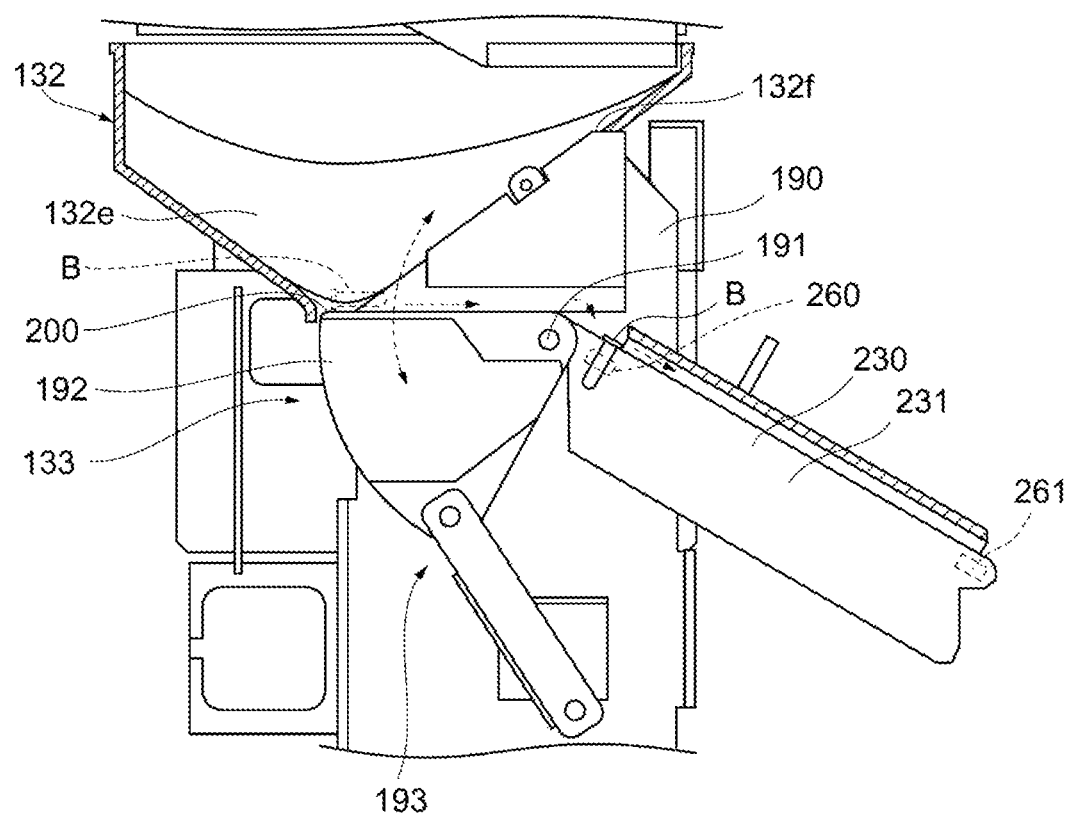
FIG. 12 illustrates one example of inner structures of the second storage part and the transporter.
Figure 12:
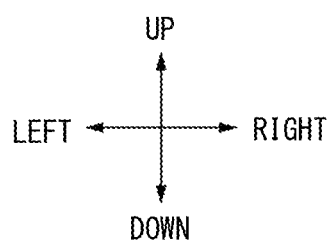

As shown in FIG. 10 and FIG. 12, for example, the taking-out mechanism 180 includes a perpendicular plate 190 provided such that the plate face is directed forward; a rotation shaft 191 fixed to the plate face of the perpendicular plate 190; a pick-up member 192 which swings up and down about the rotation shaft 191 and picks up a cuvette B from the second storage part 132; and a swing mechanism 193 which causes the pick-up member 192 to swing up and down.

In the bottom wall 132e of the second storage part 132, a slit 132f is formed along the right-left direction. The perpendicular plate 190 is disposed at the slit 132f. The pick-up member 192 has a substantially fan shape, for example, and is mounted to the rotation shaft 191 such that the side face of the fan shape is directed upward. The pick-up member 192 includes, at the upper face thereof, a placement portion 200 of a groove shape that allows a cuvette B to be placed such that the longitudinal direction of the cuvette B is aligned with the sending-out direction extending in the right-left direction (i.e., in a state where the cuvette B is laid down).

The swing mechanism 193 is a link mechanism. The swing mechanism 193 can cause the pick-up member 192 to rotate about the rotation shaft 191, thereby causing the pick-up member 192 to swing between a first position at which the placement portion 200 is located at the lowest portion of the bottom wall 132e of the second storage part 132; and a second position at which the placement portion 200 is inclined such that the sending-out direction side thereof (right side) is positioned lower than the other side thereof.

The transport path 181 is configured to stand the cuvette B having slid to the sending-out direction side from the inclined placement portion 200, such that the flange b2 is at the upper side thereof; and send the cuvette B in this standing state to the cuvette sending-out part 182.

Specifically, the transport path 181 has two [[ ]] parallel-disposed linear rails 230 which are continuous to the inclined placement portion 200, and which extend toward the cuvette sending-out part 182. The rails 230 are inclined so as to be gradually lowered toward the cuvette sending-out part 182. A slit 231 is formed between the two rails 230. The width of the slit 231 is greater than the outer diameter D1 of the trunk portion b1 of the cuvette B, and is smaller than the outer diameter D2 of the flange b2. Accordingly, the trunk portion b1 of the cuvette B enters the slit 231 in the transport path 181 and the flange b2 is caught by the rails 230. As a result, the cuvette B stands up, with the flange b2 at the upper side. The cuvette B in the standing state slides along the rails 230 and the slit 231, and drops.

Figure 13:
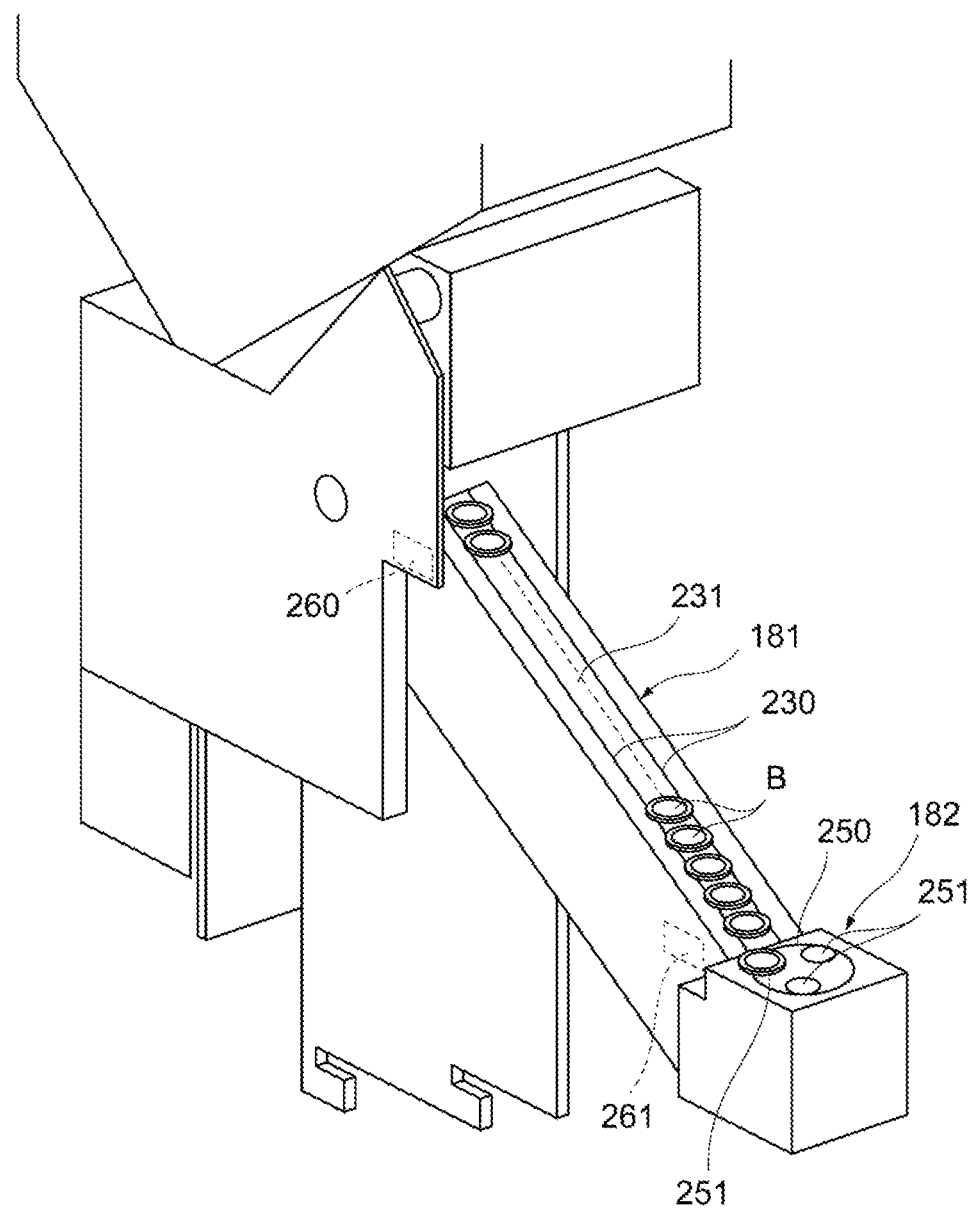
FIG. 13 illustrates a configuration of a transport path.

As shown in FIG. 13, the cuvette sending-out part 182 has a substantially rectangular parallelepiped outer shape. The cuvette sending-out part 182 includes a rotary part 250 which is rotated by a drive unit (not shown), for example. The rotary part 250 has a cylindrical shape, and the outer peripheral face thereof is provided with a plurality of, e.g., three, accommodation holes 251. Each accommodation hole 251 has a substantially cylindrical shape that can accommodate a cuvette B from the outer peripheral face of the rotary part 250. A cuvette B having dropped along the transport path 181 is accommodated and held in an accommodation hole 251 when the rotary part 250 is rotated and the accommodation hole 251 meets the slit 231 between the rails 230. When no accommodation hole 251 meets the slit 231 between the rails 230, the cuvette B remains on the rails 230. Normally, the dropping amount of cuvettes B in the transport path 181 is set to be large compared with the number of cuvettes B that are held in the cuvette sending-out part 182, and thus, a plurality of cuvettes B are accumulated along the transport path 181 up to the upper portion of the rails 230 (i.e., waiting state). The transport path 181 can hold a predetermined number, e.g., 10, cuvettes B in accordance with the length of the transport path 181.

The cuvette supply device 30 includes a sensor that can detect the state of transport of cuvettes B by the transporter 133. Specifically, the transport path 181 is provided with a first sensor 260 provided at the uppermost portion of the rails 230 and capable of detecting the presence or absence of a cuvette B and passage of a cuvette B; and a second sensor 261 provided at the lowest portion of the rails 230 and capable of detecting the presence or absence of a cuvette B. The first sensor 260 and the second sensor 261 are each a noncontact-type light sensor having a light applicator and light receiver, for example. The first sensor 260 and the second sensor 261 each detect the presence or absence of a cuvette B on the basis of whether the light receiver has received light applied from the light applicator. Detection results by the first sensor 260 and the second sensor 261 are outputted to the controller 26.

The controller 26 is a computer, for example. As a result of a CPU executing a program stored in a memory, the controller 26 can control drive of various drive units for the specimen injection arm 27, the reagent injection devices 28, 29, the first arm 31, the second arm 32, the third arm 33, the specimen container sending-in unit 20, the first table 21, the second table 22, the heating unit 23, the analysis unit 24, the cuvette supply device 30, and the like, whereby an analysis process on specimens can be performed. In particular, in the analysis process, the controller 26 can control operation of the vibration providing mechanism 166 on the basis of detection results, by the sensors 260, 261, of the state of transport of cuvettes B.

<Operation of Analyzer>

Next, operation (control) of the analyzer 1 configured as described above is described.

Figure 14:
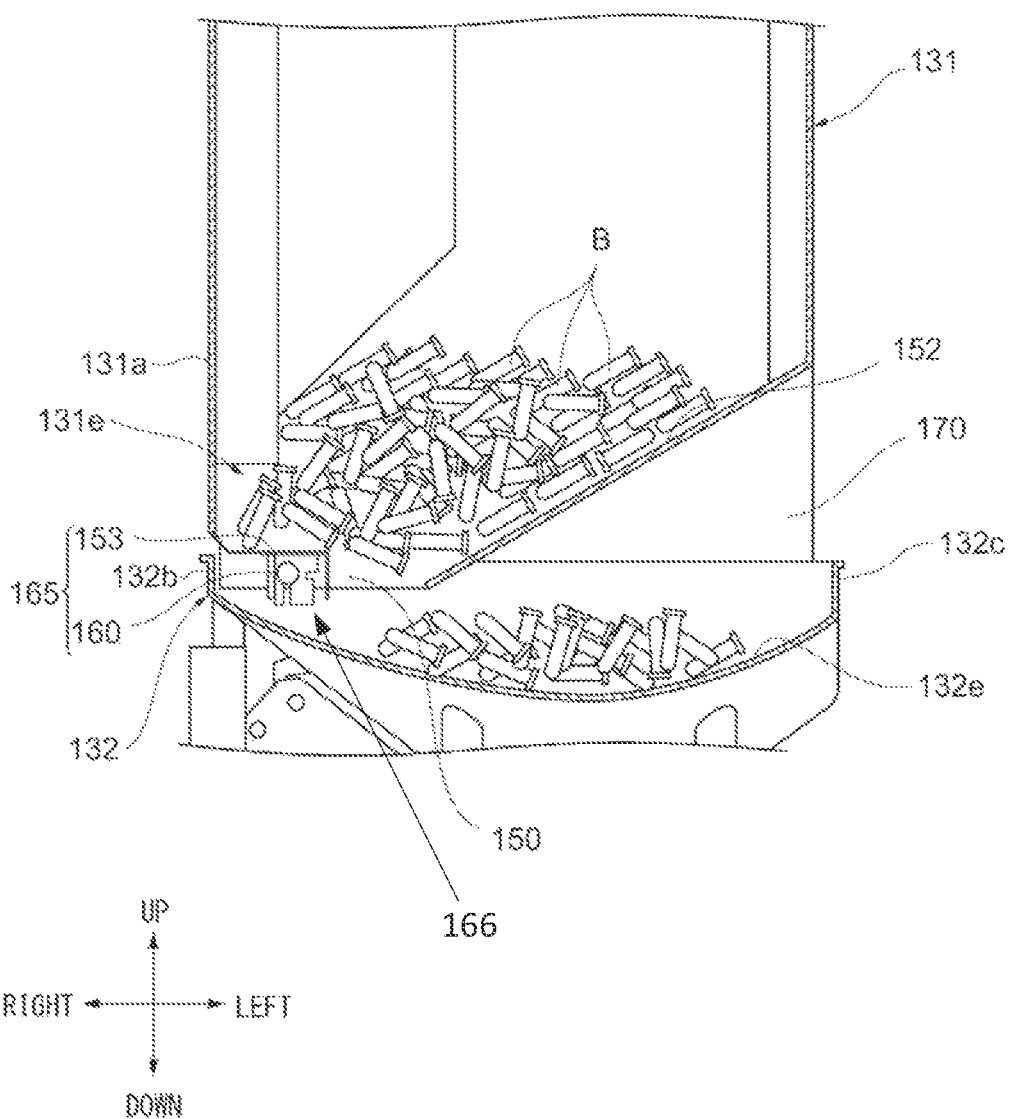
FIG. 14 illustrates a state where cuvettes are stored in the first storage part and the second storage part.

First, before an analysis process on specimens such as blood is started, a user loads a large number of empty cuvettes B into the cuvette supply device 30. At this time, the user opens the lid 142 of the ceiling wall 10d of the housing 10 shown in FIG. 5, and loads a large number of empty cuvettes B through the inlet 140. The loaded cuvettes B pass the transport path 141 to be supplied to the first storage part 131. As shown in FIG. 14, some of the cuvettes B supplied to the first storage part 131 drop through the outlet 150 into the second storage part 132, and the rest of the cuvettes B are congested due to natural friction force among the cuvettes B, and stored in the first storage part 131. At this time, a substantially constant amount of cuvettes B, which is not too much for the storage capacity of the second storage part 132, are stored in the second storage part 132.

Next, when the transporter 133 is driven, the pick-up member 192 swings up and down at a constant speed. As shown in FIG. 12, the pick-up member 192 is firstly at the first position corresponding to the lowest portion of the second storage part 132, and then the pick-up member 192 rotates upward about the rotation shaft 191. The pick-up member 192 picks up one cuvette B, swings upward to the second position with the cuvette B placed on the placement portion 200, and is inclined such that the sending-out direction side of the placement portion 200 is positioned lower than the other side thereof. The cuvette B slides to the transport path 181 side in the sending-out direction, and moves onto the rails 230 of the transport path 181. At this time, as shown in FIG. 13, the trunk portion b1 of the cuvette B falls into the slit 231 and the flange b2 is held by the rails 230, whereby the cuvette B is made to stand up. In this state, the cuvette B drops along the slope of the transport path 181, hits the rotary part 250 of the cuvette sending-out part 182, and stops. When this is repeated, cuvettes B are sequentially accumulated from the lower portion in the transport path 181, and finally, a predetermined number of cuvettes B are held up to the uppermost portion of the transport path 181.

When the rotary part 250 is rotated at a predetermined timing and the position of an accommodation hole 251 and the position of the slit 231 are aligned with each other, the cuvette B enters the accommodation hole 251. The cuvette B in the cuvette sending-out part 182 is transported to the first table 21 by the first arm 31 shown in FIG. 2, and is held in a cuvette holder 50. This is repeated, and empty cuvettes B are arranged on the first table 21 in the circumferential direction.

Next, when an analysis process on specimens is started, a rack R holding a plurality of specimen containers A is sent into the rack sending-in unit 40 of the specimen container sending-in unit 20, first. The rack R is transported by the transport device 43 to the specimen suction unit 41. Next, the specimen in a specimen container A in the rack R is suctioned by the specimen injection arm 27, and is injected into an empty cuvette B on the first table 21. Next, the cuvette B is held by the second arm 32, and is moved to a position below the first reagent injection device 28.

Next, the reagent in a reagent container C on the second table 22 is suctioned by the nozzle 101 of the first reagent injection device 28, is heated to a predetermined temperature, and then, is injected into the cuvette B held by the second arm 32. Accordingly, the specimen in the cuvette B and the reagent are mixed together.

Next, the cuvette B is transported to the heating plate 70 of the heating unit 23 by the second arm 32. Here, the mixture of the reagent and the specimen in the cuvette B is heated to a predetermined temperature.

Subsequently, the cuvette B is held by the third arm 33, and is moved to a position below the second reagent injection device 29, for example. Next, the reagent in a reagent container C on the second table 22 is suctioned by the nozzle 101 of the second reagent injection device 29, and is injected into the cuvette B held by the third arm 33. Accordingly, the specimen in the cuvette B and the reagent are mixed together, whereby an analysis sample is prepared.

Next, the cuvette B is transported to the analysis plate 80 of the analysis unit 24 by the third arm 33. It should be noted that there are cases where no reagent is injected by the second reagent injection device 29. In such a case, the cuvette B in the heating unit 23 is directly transported to the analysis unit 24 by the third arm 33.

In the analysis unit 24, analysis on the analysis sample in the cuvette B is performed. When the analysis ends, the cuvette B is transported to the discharge part 25 by the third arm 33, and is discharged.

During the analysis process described above, empty cuvettes B are supplied from the second storage part 132 to the cuvette sending-out part 182, and are supplied from the cuvette sending-out part 182 to the first table 21. Thus, cuvettes B in the second storage part 132 are gradually reduced. Therefore, the second storage part 132 also needs to be supplied with cuvettes B. Supply of cuvettes B to the second storage part 132 is performed by causing the vibration providing mechanism 166 to operate, thereby causing a plurality of cuvettes B in the first storage part 131 to drop through the outlet 150. When the vibration providing mechanism 166 is operated, the vibration member 160 vibrates and then the vibration plate 153 vibrates to provide vibration to cuvettes B therearound. Accordingly, some of the cuvettes B drop due to the vibration. The dropping amount (supply amount) of cuvettes B at this time is dependent on the strength and time period of the vibration.

Figure 15:
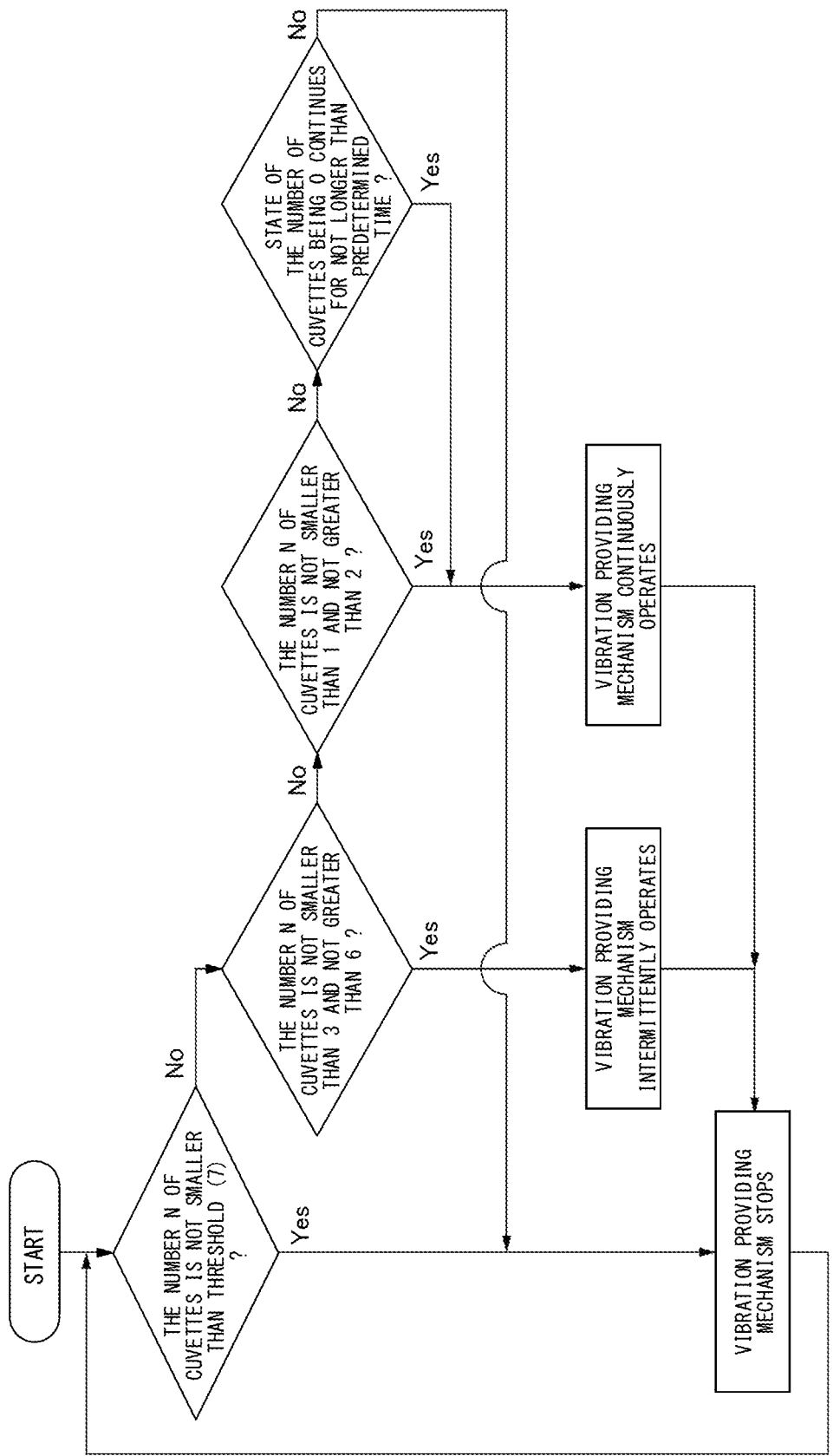
FIG. 15 is a flow chart showing major operation steps of a vibration providing mechanism.

Next, control of the operation of the vibration providing mechanism 166 when cuvettes B are supplied to the second storage part 132 is described. FIG. 15 is a flow chart showing a flow of major operation control of the vibration providing mechanism 166.

First, the controller 26 grasps the state of transport, e.g., a number N of cuvettes B, in the transport path 181. The number N of cuvettes B is grasped by use of control signals and the like of the first sensor 260, the second sensor 261, and the controller 26 itself. For example, the first sensor 260 counts the number of cuvettes B that have passed the uppermost portion of the transport path 181. The controller 26 counts control commands which have been given to the first arm 31 and which are each for sending out a cuvette B from the cuvette sending-out part 182. Then, the number N of cuvettes B is grasped by subtracting a number n2, which is the number of cuvettes B having been sent out from the cuvette sending-out part 182, from a number n1, which is the number of cuvettes B counted by the first sensor 260, for example. For counting the number n2 of cuvettes B, a sensor may be provided to the cuvette sending-out part 182 to count the number n2. Alternatively, the number n2 of cuvettes B may be obtained as the number of cuvettes B, counted by the second sensor 261, that have been transported from the transport path 181 to the cuvette sending-out part 182.

The controller 26 controls the operation of the vibration providing mechanism 166 on the basis of the number N of cuvettes B in the transport path 181.

For example, when it has been determined that the number N of cuvettes B in the transport path 181 is not smaller than a predetermined threshold H, e.g., 7 or greater, against the maximum number 10, the vibration providing mechanism 166 does not provide vibration. Meanwhile, when the number N of cuvettes B in the transport path 181 is smaller than the predetermined threshold H, i.e., when 6 or smaller, the vibration providing mechanism 166 provides vibration.

When the vibration providing mechanism 166 provides vibration, the degree of vibration may be changed in accordance with the number N of cuvettes B. For example, when the number N of cuvettes B is not smaller than 3 and not greater than 6, vibration is intermittently provided for a predetermined time period. For example, when the number N of cuvettes B is not smaller than 0 and not greater than 2, vibration is continuously provided for a predetermined time period.

Further, when the number N of cuvettes B is 0 and a state of the number N of cuvettes B being 0 continues for not less than a predetermined time period, e.g., 30 seconds or longer, there is a possibility that neither the first storage part 131 nor the second storage part 132 has any cuvettes B therein. Thus, vibration is stopped. The time period of the continuation of the state of the number N being 0 can be detected by the second sensor 261.

According to the present embodiment, the analyzer 1 includes two storage parts, i.e., the first storage part 131 and the second storage part 132, and thus, the total volume of the storage part can be increased. Cuvettes B stored in the first storage part 131 can be caused to drop through the outlet 150 of the bottom portion 131e of the first storage part 131 to be stored in the second storage part 132. In addition, the vibration providing mechanism 166 can control the dropping of cuvettes B through the outlet 150, thereby adjusting the amount of cuvettes B to be stored in the second storage part 132. Accordingly, there is no need to separately provide a new transporter that transports cuvettes B to the second storage part 132. Thus, increase in size of the analyzer can be suppressed.

The vibration providing mechanism 166 provides vibration to the cuvettes B in the first storage part 131. Therefore, in a state where the cuvettes B in the first storage part 131 are congested by natural friction force among the cuvettes B, it is possible to provide vibration to a plurality of cuvettes B in the first storage part 131, and to cause the cuvettes B to drop through the outlet 150 of the first storage part 131 due to the vibration. As a result, dropping of cuvettes B through the outlet 150 of the first storage part 131 can be appropriately controlled.

Since the vibration providing mechanism 166 provides vibration in the upward direction from the outlet 150 side of the first storage part 131, vibration can be provided in the opposite direction of gravity, to the cuvettes B stored in the first storage part 131. This facilitates movement of the cuvettes B congested in the first storage part 131. Thus, dropping of cuvettes B through the outlet 150 of the first storage part 131 can be appropriately controlled.

The vibration providing mechanism 166 includes the vibration plate 153 disposed in the vicinity of the outlet 150 of the first storage part 131, and the vibration member 160 which vibrates the vibration plate 153. Accordingly, vibration is provided from the vibration plate 153 having a plate shape, to the cuvettes B in the vicinity of the outlet 150 of the first storage part 131. Therefore, the vibration is effectively transmitted, and dropping of cuvettes B through the outlet 150 of the first storage part 131 can be appropriately controlled. The "vicinity of the outlet 150" includes a range within 20 cm, preferably within 15 cm, and more preferably within 5 cm, from the outlet 150.

Since the vibration plate 153 forms a part of the bottom portion 131e of the first storage part 131, a bottom portion that is in contact with cuvettes B stored in the first storage part 131 vibrates. As a result, the vibration of the vibration plate 153 is directly transmitted to the cuvettes B, and dropping of cuvettes B through the outlet 150 can be appropriately controlled.

Since the vibration plate 153 forms at least a part of the edge of the outlet 150, a part of the edge of the outlet 150 vibrates. As a result, the vibration is directly transmitted to cuvettes B in the vicinity of the outlet 150, and dropping of cuvettes B through the outlet 150 can be appropriately controlled.

The vibration plate 153 has the upper face 153c opposed to the interior of the first storage part 131 and the outer side face 153d opposed to the outlet 150. The upper face 153c and the outer side face 153d are smoothly connected to each other at the upper end of the edge of the outlet 150. Accordingly, cuvettes B can be prevented from being damaged when colliding with the upper end of the edge of the outlet 150.

The vibration member 160 is provided at the back face, of the vibration plate 153, which is not opposed to the interior of the first storage part 131. Therefore, cuvettes B are prevented from hitting the vibration member 160, and the cuvettes B and the vibration member 160 are protected. Accordingly, the vibration member 160 can be prevented from being damaged.

The outlet 150 has dimensions that satisfy the relationship of L<D<2×L when the maximum dimension of the cuvette B is defined as L, and the maximum opening dimension of the outlet 150 is defined as D. This allows cuvettes B to easily remain in the vicinity of the outlet 150. Thus, dropping of cuvettes B can be appropriately inhibited. Accordingly, the amount of cuvettes B that drop into the second storage part 132 can be appropriately restricted. In the case of D≤L, cuvettes B could be stuck in the outlet 150. In the case of 2×L≤D, too many cuvettes B could drop through the outlet 150.

The first storage part 131 is configured to be able to store more cuvettes B than the second storage part 132. Accordingly, the storage capacity of the second storage part 132 is relatively small. Thus, it is possible to inhibit occurrence of a state where the transporter 133 of the second storage part 132 is buried with cuvettes B and cannot perform transport. Meanwhile, since the storage capacity of the first storage part 131 is relatively large, the total volume of the two storage parts can be increased.

The analyzer 1 includes the housing 10 which covers the body of the analyzer, and the housing 10 is provided with the lid 171 that allows access to the second storage part 132. Therefore, if an excessive amount of cuvettes B have entered the second storage part 132, it is possible to take out excess cuvettes B in the second storage part 132 to the outside of the housing 10 by opening the lid 171. As a result, maintenance work is facilitated.

The analyzer 1 includes the sensors 260, 261 that can each detect the state of transport of cuvettes B by the transporter 133; and the controller 26 which controls operation of the vibration providing mechanism 166 on the basis of detection results, by the sensors 260, 261, of the state of transport of cuvettes B. Thus, the state of transport of cuvettes B from the second storage part 132 by the transporter 133 can be detected by use of the sensors 260, 261. Then, on the basis of the state of transport, operation of the vibration providing mechanism 166 can be controlled so as to adjust dropping of cuvettes B through the outlet 150 of the first storage part 131 into the second storage part 132. As a result, the amount of cuvettes B stored in the second storage part 132 can be more strictly controlled. For grasping the state of transport of cuvettes B, either one of the sensors 260, 261 may be used, or a sensor other than the sensors 260, 261, a control signal, or the like may be used.

Since the analyzer 1 includes the loading part 130 for loading cuvettes B into the first storage part 131, cuvettes B can be appropriately loaded into the first storage part 131.

<Another Aspect of Discharge Controller>

In the above embodiment, the discharge controller that can control the dropping of cuvettes B through the outlet 150 of the first storage part 131 has the vibration providing mechanism 166. However, the discharge controller may have another mechanism.

Figure 16:
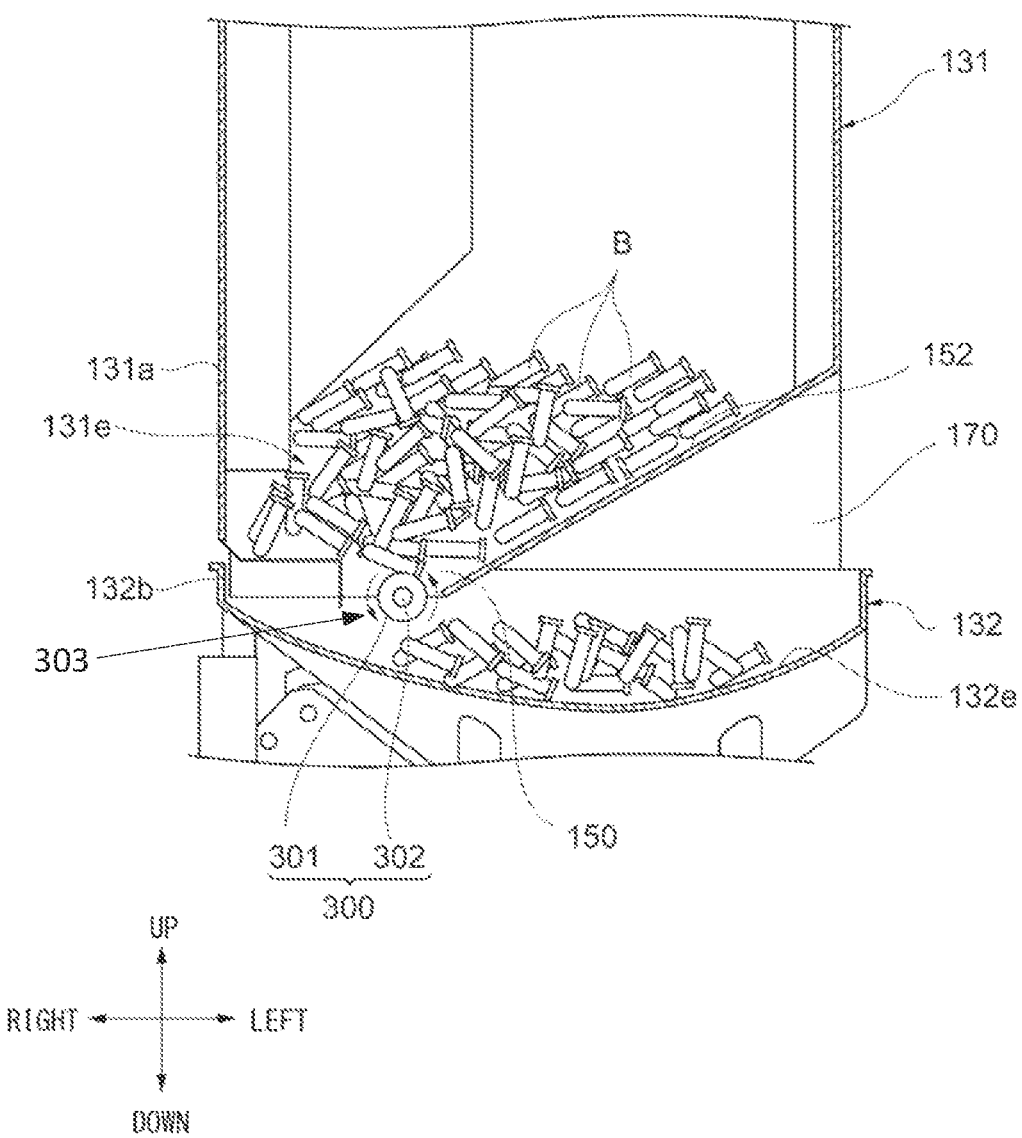
FIG. 16 illustrates a case where a discharge controller includes a rotation mechanism.

For example, as shown in FIG. 16, the discharge controller 300 may have a rotation mechanism 303 which is provided in the vicinity of the outlet 150 and which performs rotation drive. For example, the rotation mechanism 303 includes a rotating body 301 provided in the vicinity of the outlet 150, and a motor 302 which drives the rotating body 301. The drive of the motor 302 is controlled by the controller 26. In this case, similar to the case of the vibration providing mechanism 166, the rotation drive of the rotation mechanism 303 is controlled in accordance with the number N of cuvettes B in the transport path 181. For example, when the number N of cuvettes B is smaller than the predetermined threshold H, the rotating body 301 of the rotation mechanism 303 is rotated, and when the number N is not smaller than the predetermined threshold H, the rotating body 301 of the rotation mechanism 303 is not rotated. When the rotating body 301 of the rotation mechanism 303 is rotated, vibration and direct force are provided to a plurality of cuvettes B stored in the first storage part 131, and due to the external force such as the vibration, cuvettes B drop through the outlet 150 of the first storage part 131 to be stored in the second storage part 132. Meanwhile, when the rotation of the rotating body 301 of the rotation mechanism 303 is stopped, cuvettes B do not drop through the outlet 150 of the first storage part 131, and cuvettes B are not supplied to the second storage part 132.

Also in the present aspect, dropping of cuvettes B through the outlet 150 of the first storage part 131 can be appropriately controlled.

Figure 17:
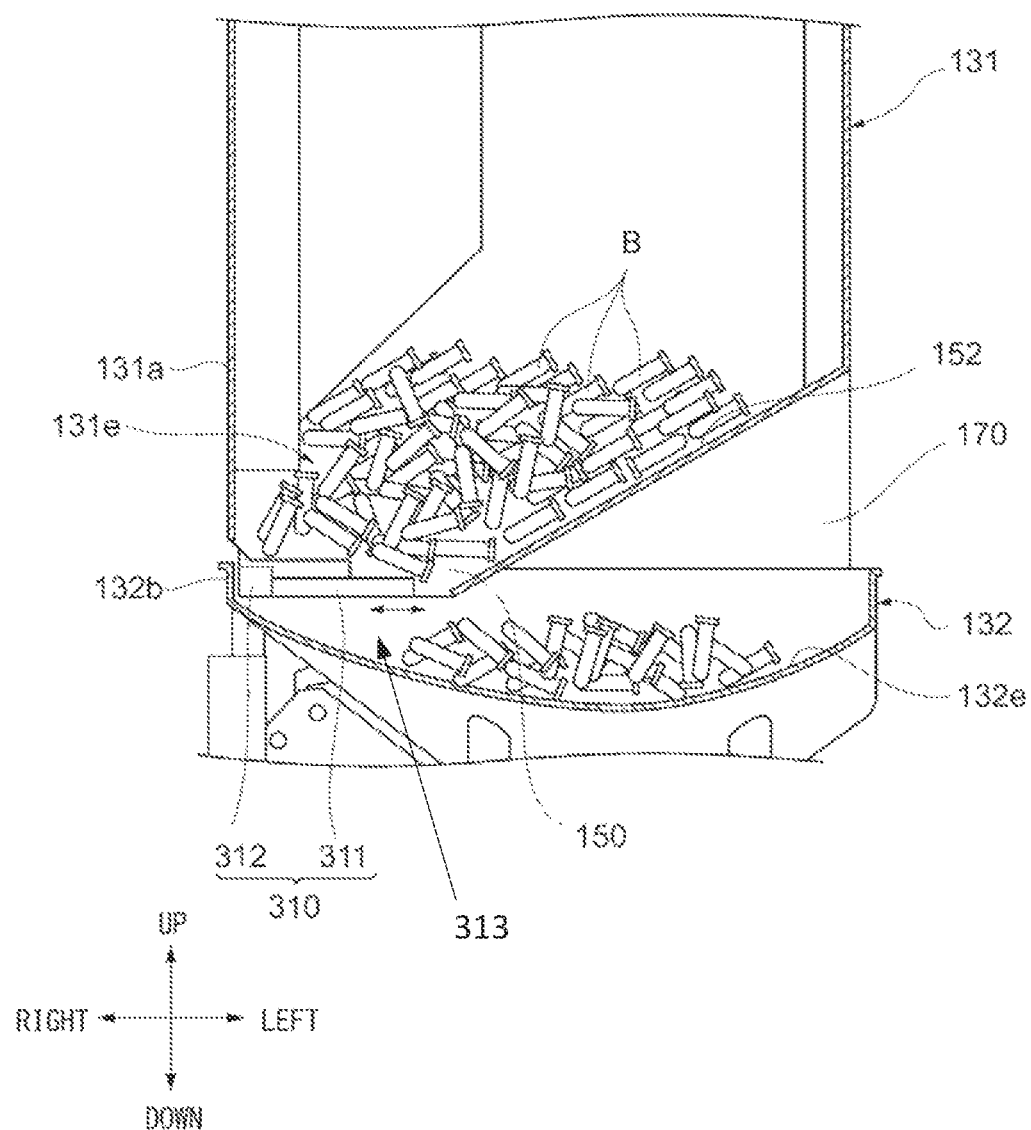
FIG. 17 illustrates a case where the discharge controller includes an opening/closing mechanism.

As still another aspect, the discharge controller 310 may have an opening/closing mechanism 313 which opens/closes the outlet 150 as shown in FIG. 17. For example, the opening/closing mechanism 313 includes an opening/closing plate 311 provided at the outlet 150, and a motor 312 which drives the opening/closing plate 311. The drive of the motor 312 is controlled by the controller 26. In this case, similar to the case of the vibration providing mechanism 166, the opening/closing drive of the opening/closing mechanism 313 is controlled in accordance with the number N of cuvettes B in the transport path 181. For example, when the number N of cuvettes B is smaller than the predetermined threshold H, the opening/closing plate 311 of the opening/closing mechanism 313 is opened, whereby the outlet 150 is made open. When the number N is not smaller than the predetermined threshold H, the opening/closing plate 311 of the opening/closing mechanism 313 is closed, whereby the outlet 150 is closed. When the outlet 150 is made open, cuvettes B drop through the outlet 150 of the first storage part 131 to be stored in the second storage part 132. Meanwhile, when the outlet 150 is closed, cuvettes B do not drop through the outlet 150 of the first storage part 131, and cuvettes B are not supplied to the second storage part 132.

According to the present aspect, dropping of cuvettes B through the outlet 150 of the first storage part 131 can be appropriately controlled.

Figure 18:
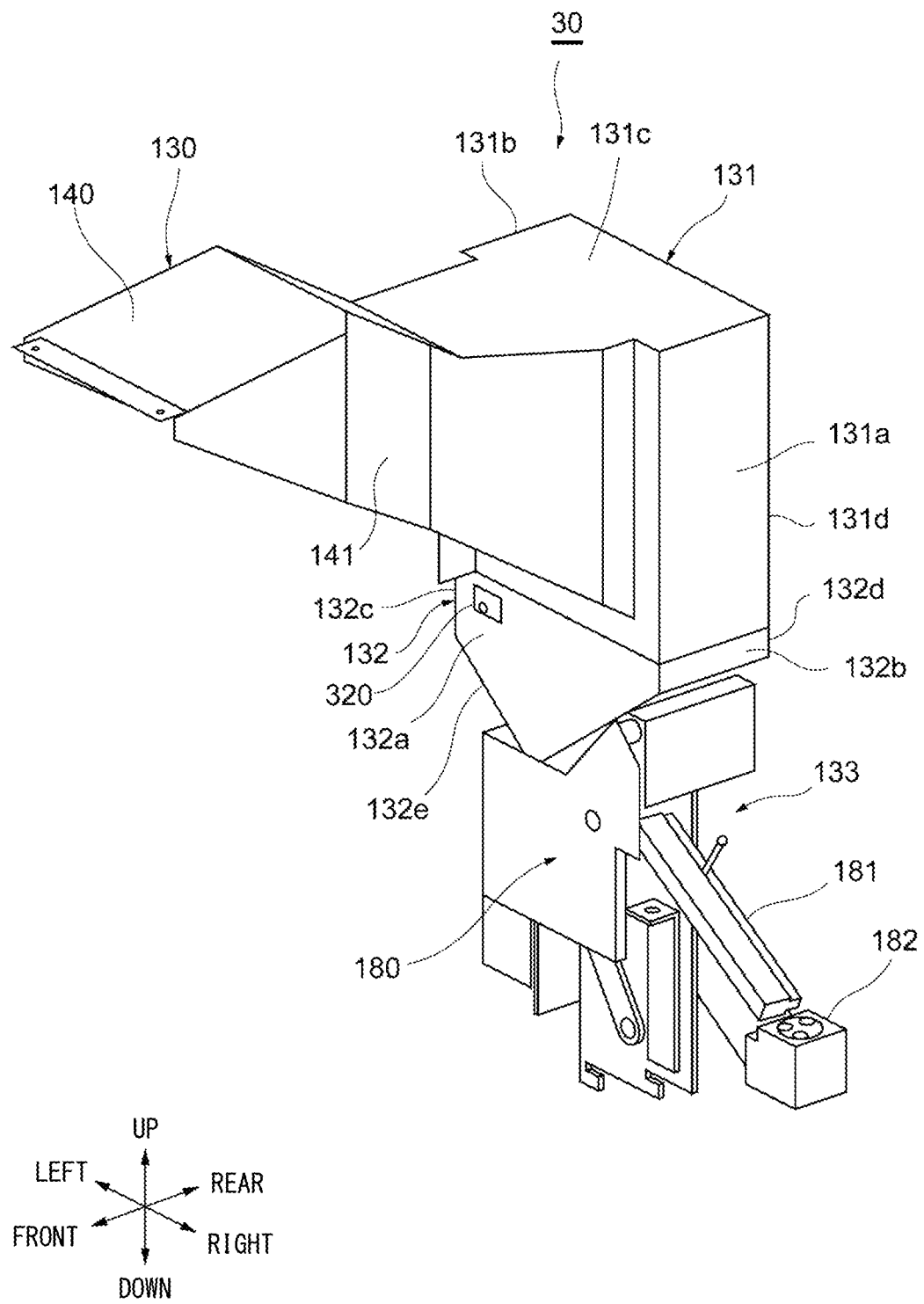
FIG. 18 illustrates a case where the second storage part includes a vibration member.
Figure 19:
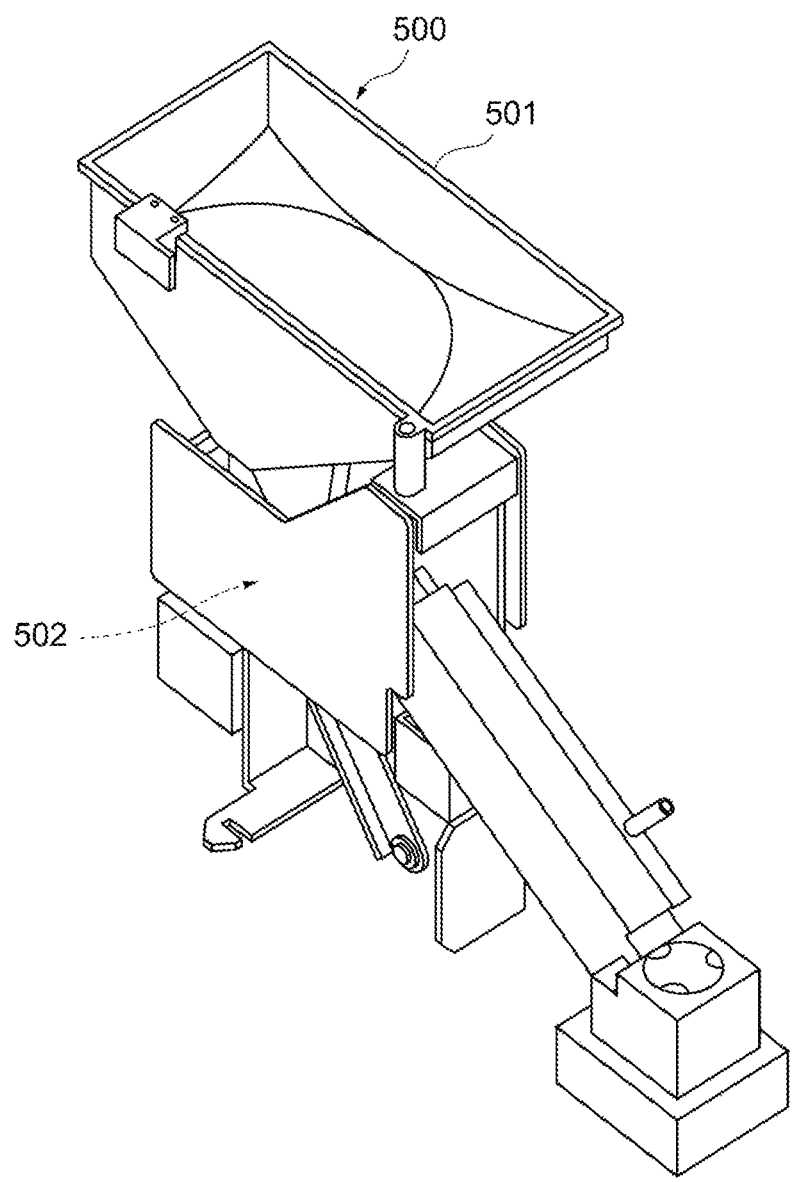
FIG. 19 is a schematic diagram for describing a configuration according to a relevant technology.
Figure 20:
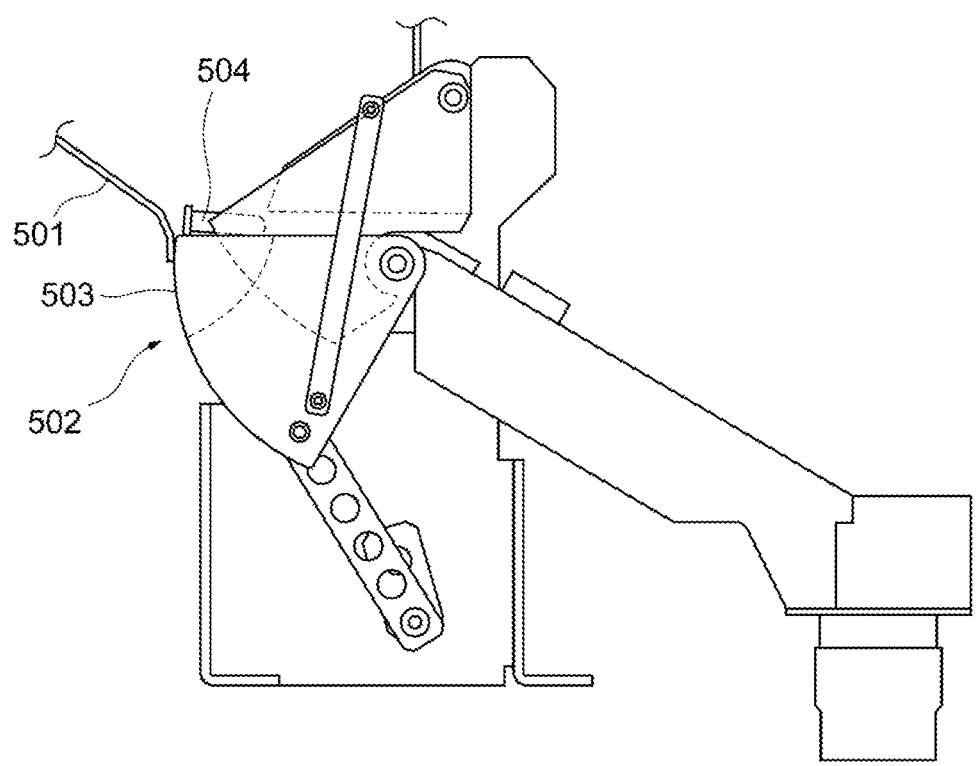
FIG. 20 is a schematic diagram for describing a configuration according to the relevant technology.

In the embodiment described above, as shown in FIG. 18, the second storage part 132 may include a vibration member 320. For example, the vibration member 320 is provided in an upper portion of the front wall 132a of the second storage part 132. The vibration member 320 is a vibration actuator. The drive of the vibration member 320 is controlled by the controller 26. The controller 26 controls the drive of the vibration member 320 on the basis of the presence or absence, detected by the first sensor 260, of a cuvette B at the uppermost portion of the transport path 181, for example.

Specifically, when the first sensor 260 does not detect any cuvette B for not less than a predetermined time period, e.g., 15 seconds or longer, the vibration member 320 is vibrated. Accordingly, for example, such a cuvette B that is caught at an upper portion of the second storage part 132 falls to the lowest portion, and is transported by the transporter 133. As a result, the cuvette B can be appropriately sent out from the second storage part 132.

Although a preferable embodiment of the present disclosure has been described with reference to the attached drawings, the present disclosure is not limited thereto. It is clear that a person skilled in the art could conceive of various changes and modifications within the scope of the idea described in claims. It is understood that such changes and modifications are also included in the technological scope of the present disclosure.

For example, the vibration providing mechanism 166 in the embodiment described above includes the vibration plate 153 and the vibration member 160, but not limited thereto, the vibration providing mechanism 166 may have another configuration. The shapes, the provision positions, and the provision numbers of the vibration plate 153 and the vibration member 160 may be those in other aspects. In particular, the vibration plate 153 is not necessarily provided in the bottom portion 131e of the first storage part 131, but may be provided at any of side walls that are close to the outlet 150, for example.

The analyzer 1 has components such as the first table 21, the second table 22, the heating unit 23, and the analysis unit 24 as shown in FIG. 2. However, the analyzer of the present disclosure is not limited thereto, and may have another structure. The analyzer of the present disclosure can be applied not only to blood coagulation analysis but also to another type of blood analysis such as a hematoimmunology test, as well as analysis of specimens other than blood. The cuvette supply device 30 does not necessarily have the configuration described in the above embodiment, and may have another configuration. Also, the configurations of the first storage part 131, the second storage part 132, the transporter 133, and the like are not limited to those in the above embodiment. The discharge controller may be implemented as a component other than the vibration providing mechanism 166, the rotation mechanism 303, or the opening/closing mechanism 313. The shape and the configuration of the cuvette B are not limited to those in the above embodiment, and another container may be used. In the embodiment described above, the cuvette B directly drops through the outlet 150 of the first storage part 131 into the second storage part 132. However, for example, a transport path or the like for the cuvette B may be provided between the outlet 150 of the first storage part 131 and the second storage part 132, and the cuvette B may drop, due to gravity, through the outlet 150 of the first storage part 131 via the transport path into the second storage part 132.

What is claimed is:

1. An analyzer comprising:
   an analysis unit configured to analyze a specimen;
   a first storage part configured to store a plurality of containers capable of containing the specimen, the first storage part including an outlet that allows the containers to be discharged therethrough;
   a second storage part configured to store the containers having been discharged through the outlet of the first storage part, the outlet opened between the first storage part and the second storage part;
   a transporter configured to send out, from the second storage part, the containers stored in the second storage part; and
   a discharge controller comprising a vibration member disposed between the first storage part and the second storage part, the discharge controller configured to cause vibration of the containers in the first storage part so that at least some of the containers independently drop by gravity out of the first storage part and into the second storage part through the outlet,
   wherein the discharge controller includes:
   a vibration plate provided in a vicinity of the outlet of the first storage part, wherein the vibration plate includes a first plate portion perpendicularly arranged with respect to a second plate portion such that the first plate portion is disposed along a wall of the first storage part; and
   the vibration member configured to vibrate the first plate portion and the second plate portion of the vibration plate.

2. The analyzer of claim 1, wherein
   the second storage part is arranged to receive the containers having dropped through the outlet of the first storage part, and
   the discharge controller is configured to control drop of the containers through the outlet of the first storage part.

3. The analyzer of claim 1, wherein the vibration member provides vibration in an upward direction with respect to the first storage part.

4. The analyzer of claim 1, wherein the first plate portion of the vibration plate forms at least a part of a bottom portion of the first storage part, and the second plate portion extends to the outlet to form an edge of the outlet.

5. The analyzer of claim 4, wherein the first plate portion is perpendicularly coupled with the second plate portion to form the edge of the outlet.

6. The analyzer of claim 5, wherein
   the first plate portion of the vibration plate has an upper face facing an interior of the first storage part and the second plate portion of the vibration plate includes a side face positioned in the outlet, and
   the upper face and the side face are perpendicularly connected to each other at an upper end of the edge of the outlet so that the containers contacting the edge when dropping through the outlet are undamaged.

7. The analyzer of claim 1, wherein the vibration member is provided to the first plate portion of the vibration plate.

8. The analyzer of claim 1, wherein the outlet has dimensions that satisfy a relationship of L<D<2×L when a maximum dimension of the containers is defined as L and a maximum opening dimension of the outlet is defined as D.

9. The analyzer of claim 1, wherein the first storage part is configured to be able to store a greater number of the containers than the second storage part.

10. The analyzer of claim 1, further comprising a housing configured to cover a body of the analyzer, wherein the housing is provided with a lid that allows access to the second storage part.

11. The analyzer of claim 1, further comprising:
a sensor arranged to detect a state of transport of the containers by the transporter; and
a controller programmed to control operation of the discharge controller based on a detection result, by the sensor, of the state of transport of the containers.

12. The analyzer of claim 1, further comprising a loading part configured to allow the containers to be loaded into the first storage part.

13. The analyzer of claim 1, wherein the vibration member cooperatively operates with the vibration plate to cause vibration of the containers to lower frictional forces between the containers so that at least some of the containers independently drop by gravity out of the first storage part into the second storage part through the outlet.

14. The analyzer of claim 1, wherein the first plate portion and the second plate portion are cooperatively operative with the vibration member to create motion of the containers in the first storage part and in the outlet that causes at least some of the containers to independently drop by gravity out of the first storage part into the second storage part through the outlet.

15. An analyzer comprising:
an analysis unit configured to analyze a specimen;
a first container storage having an internal space in which a plurality of sample containers are stored, a hole being formed in a part of a horizontal bottom of the first container storage, wherein the hole is dimensioned to allow some of the plurality of sample containers in the first container storage to fall through the hole and hold against falling through the hole a rest of the plurality of sample containers congested on the horizontal bottom of the first container storage;
a second container storage positioned vertically below the first container storage and having an internal space configured to receive and store said some of the plurality of sample containers that vertically fall from the first container storage through the hole;
a transporter configured to send out, from the second container storage, a sample container stored in the second container storage; and
a vibration member positioned at least partially in the hole to vibrate the horizontal bottom of the first container storage to shake the rest of the plurality of sample containers congested on the horizontal bottom of the first container storage so that the rest of the plurality of sample containers congested on the horizontal bottom of the first container storage fall by gravity through the hole into the second container storage.

16. An analyzer comprising:
an analysis unit configured to analyze a specimen;
a first storage part configured to store a plurality of containers capable of containing the specimen, the first storage part including an outlet that allows the containers to be discharged therethrough;
a second storage part configured to store the containers having been discharged through the outlet of the first storage part;
a third storage part configured to receive at least two containers one at a time from the second storage part;
a transporter configured to pick up the at least two containers one at a time from the second storage part and move the picked up at least two containers to the third storage part; and
a discharge controller comprising a rotation mechanism rotating around a single axis, the discharge controller configured to transfer at least one of the containers in the first storage part to the outlet by rotation of the rotation mechanism, the rotation mechanism being disposed at least partially in the outlet so that the at least one of the containers is delivered from the first storage part into the second storage part through the outlet.

17. An analyzer comprising:
an analysis unit configured to analyze a specimen;
a first container storage configured to store at least two containers each capable of containing the specimen therein, the first container storage including an outlet at a bottom of the first container storage that allows the at least two containers to fall therethrough;
a second container storage located right below the outlet of the first container storage and configured to receive and stationarily store therein the at least two containers that have fallen through the outlet of the first container storage;
a third container storage configured to receive the at least two containers one at a time from the second container storage, the third container storage having an inclined path that stores the at least two containers in a line along the path;
a container transporter configured to pick up the at least two containers one at a time from the second container storage and move the picked up at least two containers to the third container storage;
an arm configured to send out, from the third container storage, the at least two containers stored in the third container storage; and
a discharge controller comprising a vibration member disposed at least partially in the outlet, the discharge controller configured to cause vibration of the containers in the first container storage so that the at least two containers drop by gravity out of the first container storage into the second container storage through the outlet.

18. The analyzer according to claim 17, wherein the discharge controller is operated to control vibration of the vibration member according to a number of containers stored in the third container storage and stop vibration of the vibration member (i) when the number of containers stored in the third container storage is not smaller than a threshold maximum number and (ii) when the number of containers continues to be not larger than a threshold minimum number, which is smaller than the threshold maximum number, for a predetermined time period.

19. An analyzer comprising:
an analysis unit configured to analyze a specimen;
a first container storage configured to store at least two containers each capable of containing the specimen therein, the first container storage including an outlet at a bottom of the first container storage that allows the at least two containers to fall therethrough;

a second container storage located right below the outlet of the first container storage and configured to receive and stationarily store therein the at least two containers that have fallen through the outlet of the first container storage;

a third container storage configured to receive the at least two containers one at a time from the second container storage, the third container storage having an inclined path that stores the at least two containers in a line along the path;

a container transporter configured to pick up the at least two containers one at a time from the second container storage and move the picked up at least two containers to the third container storage;

an arm configured to send out, from the third container storage, the at least two containers stored in the third container storage; and a discharge controller comprising a rotation mechanism rotating around a single axis and disposed at least partially in the outlet, the discharge controller operated to rotate the rotation mechanism so that the at least two containers contacting the rotating member are delivered by rotation of the rotating member out of the first container storage into the second container storage through the outlet.

20. An analyzer comprising:

an analysis unit configured to analyze a specimen;

a first container storage configured to store at least two containers each capable of containing the specimen therein, the first container storage including an outlet at a bottom of the first container storage that allows the at least two containers to fall therethrough;

a second container storage located right below the outlet of the first container storage and configured to receive and stationarily store therein the at least two containers that have fallen through the outlet of the first container storage;

a third container storage configured to receive the at least two containers one at a time from the second container storage, the third container storage having an inclined path that stores the at least two containers in a line along the path;

a container transporter configured to pick up the at least two containers one at a time from the second container storage and move the picked up at least two containers to the third container storage;

an arm configured to send out, from the third container storage, the at least two containers stored in the third container storage; and a discharge controller comprising a shutter disposed at the outlet, the discharge controller configured to operate the shutter to open and close the outlet so that when the shutter opens the outlet, the at least two containers drop by gravity out of the first container storage into the second container storage through the outlet, whereas when the shutter closes the outlet, the at least two containers are blocked by the shutter from dropping in the second container storage, wherein the discharge controller is configured to operate the shutter to open and close the outlet according to a number of containers stored in the third container storage so that the shutter closes the outlet when the number of containers stored in the third container storage is not smaller than a threshold number, whereas the shutter opens the outlet when the number of containers stored in the third container storage is equal to or larger than the threshold number.

* * * * *